(12) United States Patent  
Kudo et al.

(10) Patent No.: US 11,970,625 B2  
(45) Date of Patent: Apr. 30, 2024

(54) LIQUID COMPOSITION, LIQUID DISCHARGING DEVICE, AND METHOD OF MANUFACTURING LIQUID COMPOSITION

(71) Applicants: Masaki Kudo, Kanagawa (JP); Yukiko Ishijima, Kanagawa (JP); Akiko Bannai, Kanagawa (JP)

(72) Inventors: Masaki Kudo, Kanagawa (JP); Yukiko Ishijima, Kanagawa (JP); Akiko Bannai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 152 days.

(21) Appl. No.: 17/806,469

(22) Filed: Jun. 10, 2022

(65) Prior Publication Data

US 2022/0403192 A1 Dec. 22, 2022

(30) Foreign Application Priority Data

Jun. 15, 2021 (JP) .................................. 2021-099605  
Apr. 15, 2022 (JP) .................................. 2022-067727

(51) Int. Cl.
*C09D 11/322* (2014.01)  
*B41J 2/165* (2006.01)  
(Continued)

(52) U.S. Cl.
CPC ......... *C09D 11/322* (2013.01); *B41J 2/16552* (2013.01); *B41M 5/0023* (2013.01);  
(Continued)

(58) Field of Classification Search
CPC ... C09D 11/322; C09D 11/033; C09D 11/037; C09D 11/102; C09D 11/107;  
(Continued)

(56) References Cited

U.S. PATENT DOCUMENTS

2011/0205288 A1 8/2011 Matsuyama et al.  
2012/0121831 A1 5/2012 Kudoh et al.  
(Continued)

FOREIGN PATENT DOCUMENTS

JP 2000-053897 2/2000  
JP 2001-139849 5/2001  
(Continued)

*Primary Examiner* — Lisa Solomon  
(74) *Attorney, Agent, or Firm* — Grüneberg and Myers PLLC

(57) ABSTRACT

A liquid composition contains a coloring material, an organic solvent, a compound represented by Chemical Formula 1 below, a resin, and water, wherein the contact angle of water against a liquid composition film formed by attaching the liquid composition to a non-permeable printing medium is 60 degrees or less, Chemical Formula 1

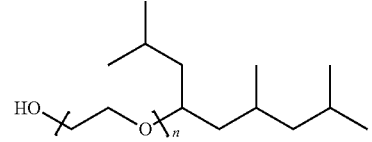

where n represents an integer of from 4 to 10.

13 Claims, 3 Drawing Sheets

(51) Int. Cl.
*B41M 5/00* (2006.01)
*B41M 7/00* (2006.01)
*C09D 11/033* (2014.01)
*C09D 11/037* (2014.01)
*C09D 11/102* (2014.01)
*C09D 11/107* (2014.01)
*C09D 11/38* (2014.01)

(52) U.S. Cl.
CPC ......... *B41M 7/0018* (2013.01); *C09D 11/033* (2013.01); *C09D 11/037* (2013.01); *C09D 11/102* (2013.01); *C09D 11/107* (2013.01); *C09D 11/38* (2013.01)

(58) Field of Classification Search
CPC ...... C09D 11/38; C09D 11/40; B41J 2/16552; B41J 2002/1655; B41J 2002/16558; B41M 5/0023; B41M 7/0018
See application file for complete search history.

(56) References Cited

U.S. PATENT DOCUMENTS

| | | |
|---|---|---|
| 2013/0063524 A1 | 3/2013 | Katoh et al. |
| 2013/0197144 A1 | 8/2013 | Katoh et al. |
| 2013/0271524 A1 | 10/2013 | Katoh et al. |
| 2015/0035896 A1 | 2/2015 | Gotou et al. |
| 2018/0339525 A1* | 11/2018 | Katoh ................ B41J 11/00216 |
| 2019/0185690 A1 | 6/2019 | Umemura et al. |
| 2019/0249020 A1 | 8/2019 | Matsuyama et al. |
| 2019/0270903 A1 | 9/2019 | Kohzuki et al. |
| 2019/0284419 A1 | 9/2019 | Kobashi et al. |
| 2020/0016898 A1 | 1/2020 | Sagara et al. |
| 2020/0102467 A1 | 4/2020 | Nakamura et al. |
| 2020/0157366 A1 | 5/2020 | Gotou et al. |
| 2020/0239714 A1 | 7/2020 | Gotou et al. |
| 2020/0316945 A1 | 10/2020 | Tanioku et al. |
| 2021/0301156 A1 | 9/2021 | Hirade et al. |
| 2021/0363369 A1 | 11/2021 | Akima et al. |
| 2022/0024220 A1 | 1/2022 | Kudo et al. |

FOREIGN PATENT DOCUMENTS

| | | |
|---|---|---|
| JP | 2005-144966 | 6/2005 |
| JP | 2013-189597 | 9/2013 |
| JP | 2015-044405 | 3/2015 |
| JP | 2016-117240 | 6/2016 |
| JP | 2018-069453 | 5/2018 |
| JP | 2018-069730 | 5/2018 |
| JP | 2019-163380 | 9/2019 |
| JP | 2020-055996 | 4/2020 |
| JP | 2020-117683 | 8/2020 |

* cited by examiner

LIQUID COMPOSITION, LIQUID DISCHARGING DEVICE, AND METHOD OF MANUFACTURING LIQUID COMPOSITION

CROSS-REFERENCE TO RELATED APPLICATIONS

This patent application is based on and claims priority pursuant to 35 U.S.C. § 119 to Japanese Patent Application Nos. 2021-099605 and 2022-067727, filed on Jun. 15, 2021 and Apr. 15, 2022, respectively, in the Japan Patent Office, the entire disclosures of which are hereby incorporated by reference herein.

BACKGROUND

Technical Field

The present disclosure relates to a liquid composition, a liquid discharging device, and a method of manufacturing a liquid composition.

Description of the Related Art

Inkjet printing is known as a method for forming images on recording media, typically paper.

The inkjet printing efficiently consumes ink, which saves resource and reduces the ink cost per unit of printing.

Since the inkjet printing has advantages of operating with variable printing on a variety of recording media, it is appealing in the commercial printing. The commercial printing requires images with a high quality of color reproducibility, abrasion resistance, durability, light resistance, drying properties, feathering, color bleed on color boundaries, beading, duplex printing, discharging stability. If ink droplets poorly cover a recording medium, gaps between dots appear, resulting in non-uniform coloring reproducibility. One way of solving this issue is to increase the amount of ink droplets; however, there is trade-off between an increase of droplets on a recording medium and the drying property, which may lead to image defects such as blocking.

One way of enhancing abrasion resistance is to apply post-processing fluid for inkjet printing; however, the fluid applied may not fully cover ink film, resulting in a high dot height, which degrades glossiness and furthermore adversely affects the image density and color saturation.

Another way is to use cleaning liquid for removing discharged ink on a nozzle surface by wiping. The image quality depends on pre-processing fluid, post-processing fluid, and cleaning liquid selected for the combinational use with ink.

SUMMARY

According to embodiments of the present disclosure, a liquid composition is provided which contains a coloring material, an organic solvent, a compound represented by Chemical Formula 1 below, a resin, and water, wherein the contact angle of water against a liquid composition film formed by attaching the liquid composition to a non-permeable printing medium is 60 degrees or less, Chemical Formula 1

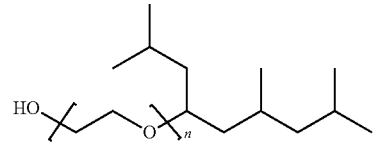

where n represents an integer of from 4 to 10.

As another aspect of embodiments of the present disclosure, a liquid discharging device is provided which includes a liquid discharging head having a nozzle, the liquid discharging head for discharging the liquid composition mentioned above through the nozzle, a liquid container containing the liquid composition supplied to the liquid discharging head, and a wiping member for wiping the surface of the nozzle, the wiping member impregnated with a cleaning liquid containing a hydrocarbon-based surfactant at 0.5 to 2.0 percent by mass.

As another aspect of embodiments of the present disclosure, a liquid discharging device is provided which includes a liquid discharging head comprising a nozzle, the liquid discharging head for discharging the liquid composition through the nozzle to a recording medium, a liquid container containing the liquid composition supplied to the liquid discharging head, a wiping member for wiping the surface of the nozzle; and a post-processing fluid applying device containing a post-processing fluid, the post-processing fluid applying device for discharging the post-processing fluid onto the liquid composition the liquid discharging device has discharged onto the recording medium.

As another aspect of embodiments of the present disclosure, a method of manufacturing the liquid composition mentioned above includes mixing the coloring material, the organic solvent, the compound represented by Chemical Formula 1, the resin, water, and the sodium hydroxide.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
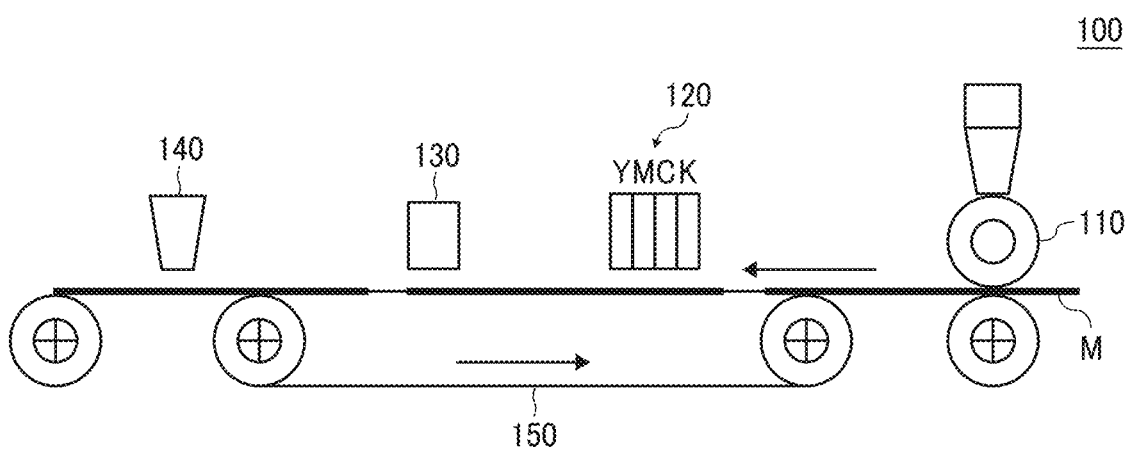
FIG. 1 is a schematic diagram illustrating an example of the liquid discharging device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

According to the present disclosure, a liquid composition is provided which demonstrates excellent color reproducibility of an image, good cleaning power, and low dot height of post-processing fluid on liquid composition film by improving the coverage with the liquid composition and liquid on the liquid composition film.

The inventors of the present invention have confirmed that a liquid composition becomes readily wettable to a substrate, thereby enlarging dots, which leads to good color reproducibility when the liquid composition contains a particular compound and the contact angle of water to film of the liquid composition is 60 degrees or less. Moreover, this composition achieves good cleanability because the liquid on liquid composition film readily covers the film and the composition is readily wiped off depending on the combination of the liquid composition and the cleaning liquid. The present inventors have also confirmed that the dot height of post-processing fluid applied onto a liquid composition film stays low, so good glossy images are produced with good color reproducibility.

Liquid Composition

The liquid composition of the present disclosure contains a coloring material, an organic solvent, a compound represented by Chemical Formula 1 below, a resin, and water, wherein the contact angle of water against a liquid composition film formed on in which the composition attaches to a non-permeable printing medium is 60 degrees or less.

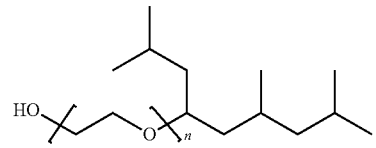

Chemical Formula 1

In Chemical Formula 1, n represents an integer of from 4 to 10.

The contact angle of water against liquid composition film is measured by viewing from the horizontal direction the state of the liquid composition film formed on a non-permeable printing medium by the image forming method described later when a single droplet of pure water is dripped to the film.

The contact angle can be measured by equipment such as an automatic contact angle meter, manufactured by Kyowa Interface Science Co., LTD. The contact angle can be obtained by viewing the droplet immediately after the dripping. As the contact angle of water against liquid composition film decreases, an organic solvent dripped onto the film is likely to cover the film, so the dot size increases, resulting in achieving good color reproducibility. Moreover, the permeability of the cleaning liquid ameliorates, which improves the wiping property. The wettability of post-processing fluid improves, thereby minimizing the dot height of images, so good glossy images with good coloring reproducibility are obtained.

One way of controlling the contact angle of water against liquid composition film to 60 degrees or lower is to work alkali on the resin in a liquid composition. It is possible to prepare a liquid composition having a contact angle of 60 degrees or lower by determining the type and amount of the resin and alkali.

The compound represented by Chemical Formula 1, organic solvent, water, coloring material, resin, and additives for use in the liquid composition are described below.

The liquid composition of the present disclosure is mainly used as ink. Ink is used as an example of the liquid composition in the following descriptions and Examples.

Compound Represented by Chemical Formula 1

Ink contains the compound represented by Chemical Formula 1. The compound of Chemical Formula 1 may serve as a surfactant.

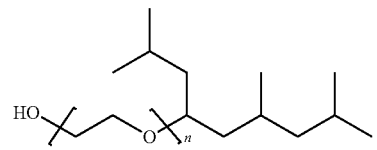

Chemical Formula 1

In Chemical Formula 1, n represents an integer of from 4 to 10.

The amount of the compound represented by Chemical Formula 1 is not particularly limited. It is preferably 0.3 percent by mass or greater to achieve good wettability. It is preferably 2 percent by mass or less to secure the dischargeability.

Moreover, it is preferable to use a silicone-based surfactant, a fluorochemical surfactant, an amphoteric surfactant, a nonionic surfactant, and an anionic surfactant in combination.

Examples of the silicone-based surfactants include, but are not limited to, side chain modified polydimethyl siloxane, both terminal-modified polydimethyl siloxane, one-terminal-modified polydimethyl siloxane, and side-chain-both-terminal-modified polydimethyl siloxane. Silicone-based surfactants having a polyoxyethylene group or polyoxyethylene polyoxypropylene group as a modification group are particularly preferable because such an aqueous surfactant demonstrates good properties. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid. Specific examples of the perfluoroalkyl carbonic acid compounds include, but are not limited to, perfluoroalkyl carbonic acid and salts of perfluoroalkyl carbonic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application. Specific examples include, but are not limited to, side-chain-modified polydimethyl siloxane, both terminal-modified polydimethyl siloxane, one-terminal-modified polydimethyl siloxane, and side chain both-terminal-modified polydimethyl siloxane. Of these, a polyether-modified silicone-based surfactant having a polyoxyethylene group or a polyoxyethylene polyoxypropylene group is particularly preferable because such a surfactant demonstrates good property as the aqueous surfactant.

Such surfactants can be synthesized or procured. Products can be procured from BYK-Chemie GmbH, Shin-Etsu Silicone Co., Ltd., Dow Corning Toray Co., Ltd., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical Formula S-1 is introduced into the side chain of the Si site of dimethyl polysiloxane.

Chemical Formula S-1

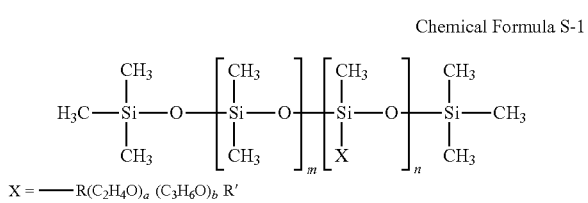

$X = \text{---}R(C_2H_4O)_a(C_3H_6O)_b R'$

In Chemical Formula S-1, "m", "n", "a", and "b" each, respectively independently represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.). FZ-2105, FZ-2118, FZ-2154, FZ-2161, FZ-2162, FZ-2163, and FZ-2164 (all manufactured by Dow Corning Toray Co., Ltd.). BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because these do not easily foam and the fluorochemical surfactant represented by the following Chemical Formula F-1 or Chemical Formula F-2 is preferable.

$$CF_3CF_2(CF_2CF_2)_m\text{---}CH_2CH_2O(CH_2CH_2O)_nH \quad \text{Chemical Formula F-1}$$

In the compound represented by Chemical Formula F-1, "m" is preferably 0 or an integer of from 1 to 10 and "n" is preferably 0 or an integer of from 1 to 40.

$$C_nF_{2n+1}\text{---}CH_2CH(OH)CH_2\text{---}O\text{---}(CH_2CH_2O)_aY \quad \text{Chemical Formula F-2}$$

In the compound represented by the Chemical Formula F-2, Y represents H or $C_mF_{2m+1}$, where n represents an integer of from 1 to 6, or $CH_2CH(OH)CH_2\text{---}C_mF_{2m+1}$, where m represents an integer of from 4 to 6, or $C_pH_{2p+1}$, where p is an integer of from 1 to 19. n represents an integer of from 1 to 6. a represents an integer of from 4 to 14.

The fluorochemical surfactant can be procured. Specific examples of the procurable products include, but are not limited to, SURFLON S-111, SURFLON S-112, SURFLON S-113, SURFLON 5-121, SURFLON S-131. SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by Sumitomo 3M Limited);

MEGAFACE F-470, F-1405, and F-474 (all manufactured by DIC CORPORATION); ZONYL™ TBS, FSP, FSA, FSN-100, FSN, FSO-100, FSO, FS-3100, UR, CAPSTONE® FS-30, FS-31, FS-3100, FS-34, FS-35 (all manufactured by The Chemours Company); FT-110, FT-250. FT-251, FT-400S, FT-150, and FT-400SW (all manufactured by NEOS COMPANY LIMITED); POLYFOX PF-136A, PF-156A, PF-15N, PF-154, PF-159 (manufactured by OMNOVA SOLUTIONS INC.), and UNIDYNE DSN-403N (manufactured by DAIKIN INDUSTRIES).

Organic Solvent

There is no specific limitation to the organic solvent for use in the present disclosure. For example, a water-soluble organic solvent can be used. It includes, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples of the water-soluble organic solvent include, but are not limited to: polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petrol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone. N-methyl-2-pyrrolidone. N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

It is preferable to use an organic solvent having a boiling point of 250 or lower degrees C., which serves as a humectant and imparts a good drying property at the same time.

Ink containing a diol compound having five or more carbon atoms is preferable because the diol enhances permeation of the ink to a recording medium.

Ink readily covers a recording medium when the ink has a good permeability to the medium. Ink suitably covering a recording medium prevents non-uniform coloring and enhances color reproducibility.

Specific examples of the diol having five or more carbon atoms include, but are not limited to, 2-ethyl-1,3-hexanediol and 2,2,4-trimethyl-1,3-pentanediol.

The diol is more preferable if it has at least one member selected from the group consisting of amide-based solvents and substituted butanols.

Coloring Material

The coloring material has no particular limitation and includes materials such as a pigment and a dye.

The pigment includes an inorganic pigment or organic pigment. These can be used alone or in combination. In addition, a mixed crystal can also be used as the coloring material.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of those pigments, pigments having good affinity with solvents are preferable. Hollow resin particles and hollow inorganic particles can also be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51, C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

Pigment dispersion ink is obtained by, for example, preparing a self-dispersible pigment by introducing a hydrophilic functional group into a pigment, coating the surface of a pigment with a resin followed by dispersion, or using a dispersant for dispersing a pigment.

One way of preparing a self-dispersible pigment by introducing a hydrophilic functional group into a pigment is to add a functional group such as a sulfone group and carboxyl group to a pigment (e.g., carbon) to disperse the pigment in water.

One way of dispersing a pigment by coating the surface of the pigment with resin is to encapsulate pigment particles in microcapsules for dispersion in water. This microcapsulated pigment is also referred to as a resin-coated pigment. The resin-coated pigment particles in ink are not necessarily entirely coated with resin.

Pigment particles not partially or wholly covered with resin may be dispersed in ink unless such particles have an adverse impact.

As the microcapsule, the reins-coated pigment include, but are not limited to, vinyl-based polymers, polyester-based polymers, and polyurethane-based polymers. Of these, the vinyl-based polymers and the polyester-based polymers are particularly suitable.

Specific examples are disclosed in, for example, Unexamined Japanese Patent Application Publication Nos. 2000-053897 and 2001-139849.

As the dispersant for use in the dispersion method described above, a known dispersant of a small or large molecular weight, typically a surfactant, is suitable.

It is possible to select an anionic surfactant, a cationic surfactant, a nonionic surfactant, an amphoteric surfactant, or others depending on a pigment.

Also, a nonionic surfactant (RT-100, manufactured by TAKEMOTO OIL & FAT CO., LTD.) and a formalin condensate of naphthalene sodium sulfonate are suitable as the dispersant. Those can be used alone or in combination.

In the present disclosure, using a resin-coated pigment is preferable to enhance the dispersion stability of pigment in ink and the fixability after printing. The proportion of the coloring material in ink is preferably from 0.1 to 15 percent by mass and more preferably from 1 to 10 percent by mass to enhance the image density, fixability, and discharging stability.

The particle diameter of the pigment in a pigment dispersion has no particular limit. For example, the maximum frequency is preferably from 20 to 500 nm and more preferably from 20 to 150 nm in the maximum number conversion to improve the dispersion stability of the pigment and ameliorate the discharging stability and the image quality such as image density. The particle diameter of the pigment can be analyzed using a particle size analyzer (Nanotrac Wave-UT151, manufactured by MicrotracBEL Corp).

The proportion of the pigment in the pigment dispersion is not particularly limited and can be suitably selected to suit a particular application. It is preferably from 0.1 to 50 percent by mass and more preferably from 0.1 to 30 percent by mass to enhance the discharging stability and image density.

It is preferable that the pigment dispersion be filtered with an instrument such as filter and a centrifuge to remove coarse particles followed by deaerating.

Resin

The type of the resin contained in ink has no particular limit and can be suitably selected to suit to a particular application. It includes, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles made of such resins can be also used. It is possible to mix a resin emulsion in which such resin particles are dispersed in water as a dispersion medium with materials such as a coloring material and an organic solvent to obtain an ink. It is possible to use suitably-synthesized resin particles as the resin particle. Alternatively, the resin particle available on the market can be used. The resin particle can be used alone or two or more type of the resin particles can be used in combination.

pH Regulator

The pH regulator can be any agent capable of adjusting the pH in the range of from 7 to 11 without having an adverse impact on formulated ink and suitably selected to suit to a particular application.

Specific examples thereof include, but are not limited to, alcohol amines, hydroxides of alkali metal elements, hydroxides of ammonium, phosphonium hydroxides, and alkali metal carbonates.

pH is preferably from 7 to 11 to prevent reaction between an inkjet head or ink supplying unit and ink and enhance the discharging stability.

Specific examples of the alcohol amines include, but are not limited to, diethanolamine, triethanolamine, and 2-amino-2-ethyl-1,3-propanediol.

Specific examples of the hydroxides of alkali metal elements include, but are not limited to, lithium hydroxide, sodium hydroxide, and potassium hydroxide.

Specific examples of the ammonium hydroxides include, but are not limited to, ammonium hydroxide and quaternary ammonium hydroxide.

A specific example of the phosphonium hydroxides is quaternary phosphonium hydroxide.

Specific examples of the alkali metal carbonates include, but are not limited to, lithium carbonate, sodium carbonate, and potassium carbonate.

It is preferable to use a strongly basic compound as the pH regulator.

In the present disclosure, ink containing sodium hydroxide or potassium hydroxide is preferable because it enhances the wettability of ink. The pH regulator is not particularly limited. It is preferably a strong alkali having a hydroxyl group and particularly preferably sodium hydroxide or potassium hydroxide to effectively minimize crystallization.

Water

The proportion of water in the ink is not particularly limited and it can be suitably selected to suit to a particular application. It is preferably from 10 to 90 percent by mass and more preferably from 20 to 60 percent by mass to enhance the drying property and discharging reliability of ink.

Additive

Ink may further optionally include a defoaming agent, a preservative and fungicide, and a corrosion inhibitor.

Defoaming Agent

The defoaming agent has no particular limit. Examples include, but are not limited to silicon-based defoaming agents, polyether-based defoaming agents, and aliphatic acid ester-based defoaming agents. These can be used alone or in combination. Of these, silicone-based defoaming agents are preferable to achieve the effect of foam breaking.

Preservatives and Fungicides

The preservatives and fungicides are not particularly limited. A specific example is 1,2-benzisothiazolone-3-one.

Corrosion Inhibitor

The corrosion inhibitor has no particular limitation. Specific examples include, but are not limited to, acid sulfites and sodium thiosulfates.

The properties of ink are not particularly limited and can be suitably selected to suit to a particular application. For example, viscosity, surface tension, and pH are preferably in the following ranges.

The viscosity of ink is preferably from 5 to 30 mPa·s and more preferably from 5 to mPa·s at 25 degrees C. to improve the print density and text quality and achieve good dischargeability. Viscosity can be measured by equipment such as a rotatory viscometer (RE-80L, manufactured by TOKI SANGYO CO., LTD.). The measuring conditions areas follows:

Standard cone rotor (1°34'×R24)
Sample liquid amount: 1.2 mL
Rate of rotation: 50 rotations per minute (rpm)
degrees C.
Measuring time: three minutes.

The surface tension of ink is preferably 35 mN/m or less and more preferably 32 mN/m or less at 25 degrees C. because the ink suitably levels on a recording medium and the ink dries in a short time.

pH of the ink is preferably from 7 to 12 and more preferably from 8 to 11 to prevent corrosion of metal material in contact with liquid.

Non-Permeable Printing Medium

The non-permeable printing medium in the present disclosure has a surface with low moisture permeability and absorbency. It includes a material having a number of hollow spaces inside that are not open to the outside. To be more quantitative, the medium has a water-absorbency of 10 or less mL/m$^2$ from the start of the contact until 30 msec$^{1/2}$ after the contact according to Bristow's method.

Specific examples of non-permeable printing medium include, but are not limited to, polyvinyl chloride resin film, polyethylene terephthalate (PET) film, polypropylene film, polyethylene film, and polycarbonate, and nylon film.

Liquid Discharging Device FIG. 1 is a diagram illustrating an example of the liquid discharging device. A liquid discharging device 100 includes a pre-processing fluid application unit 110, a liquid discharging unit 120, a post-processing fluid applying unit 130 as a post-processing fluid applying device, a drying unit 140, and a conveyance unit 150.

The pre-processing fluid application unit 110 applies pre-processing fluid to a printing medium M. Methods for applying pre-processing fluid are not particularly limited. Specific examples include, but are not limited to, inkjetting, gravure coating, gravure offset coating, bar coating, roll coating, knife coating, air knife coating, comma coating, U comma coating, AKKU coating, smoothing coating, micro gravure coating, reverse roll coating, four or five roll coating, dip coating, curtain coating, slide coating, and die coating. The pre-processing fluid application unit 110 can be omitted.

Non-permeable printing medium is used as the printing medium M. If images are formed without applying pre-processing fluid, multi-feed may occur during conveyance. Pre-processing fluid, which is applied to solve this problem, minimizes the occurrence of multi-feed during conveyance without degrading the blocking resistance.

The liquid discharging unit 120 discharges inkjet ink to the surface of the print medium M onto which the pre-processing fluid has been applied. The liquid discharging unit 120 can be any known liquid discharging head 301.

The liquid discharging unit 120 is allowed to discharge any color of ink. The head may discharge ink of color such as yellow, magenta, cyan, black, and white.

The post-processing fluid applying unit 130 discharges post-processing fluid to the region of the surface of the printing medium M onto which inkjet ink has been applied. The post-processing fluid applying unit 130 can be any known inkjet head. Instead of the post-processing fluid applying unit 130, a post-processing fluid applying unit can be disposed for applying the post-processing fluid to substantially the entire region of the surface of the printing medium M onto which the inkjet ink has been applied. The way of applying post-processing fluid is not particularly limited. Specific examples include, but are not limited to, blade coating, gravure coating, gravure offset coating, bar coating, roll coating, knife coating, air knife coating, comma coating, U comma coating, AKKU coating, smoothing coating, micro gravure coating, reverse roll coating, four or five roll coating, dip coating, curtain coating, slide coating, and die coating.

The drying unit 140 dries the printing medium M with heated wind onto which the post-processing fluid is already applied. Incidentally, the drying unit 140 can use infrared, microwave, a roll heater instead of heated wind to heat and dry the printing medium M onto which the post-processing fluid is already applied. It is also possible to naturally dry the printing medium M onto which the post-processing fluid is already applied.

The conveyance unit 150 conveys the printing medium M. There is no specific limit to the conveyance unit 150 as long as it can convey the printing medium M. A specific example is a conveyor belt.

The liquid discharging device may include a cleaning device. The configuration of the cleaning device is described later with reference to FIG. 4.

Figure 2:
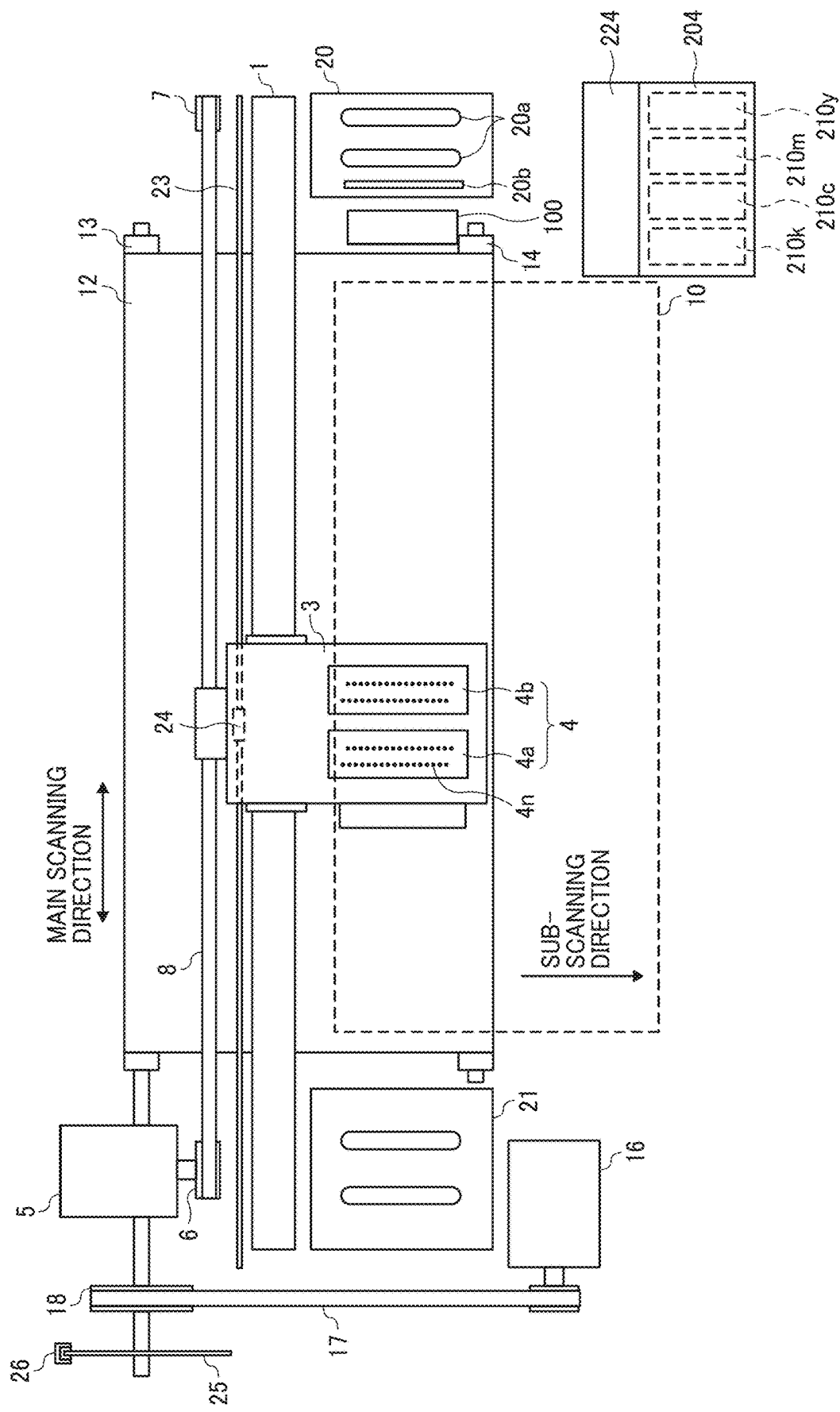
FIG. 2 is a schematic diagram illustrating an example of the liquid discharging device according to an embodiment of the present disclosure.

FIG. 2 is a schematic diagram illustrating an example of a liquid discharging device having a cleaning device and a serial liquid discharging device. The liquid discharging device is described with reference to FIGS. 2 to 4.

A main guide member 1 and a sub-guide member that are bridged between left and right side plates hold a carriage 3 in a movable manner. A main scanning motor 5 drives the carriage 3 back and forth in the main scanning direction, carriage moving direction, via a timing belt 8 looped round a drive pulley 6 and a driven pulley 7.

The carriage 3 carries print heads 4a and 4b (referred to as print head 4 if distinction thereof is not necessary) including a liquid discharging head. The print head 4 discharges ink droplets of yellow (Y), cyan (C), magenta (M), black (K), and other colors. The print head 4 carries nozzle arrays, each having nozzles 4n along the sub-scanning direction vertical to the main scanning direction with the ink discharging direction downward.

Figure 3:
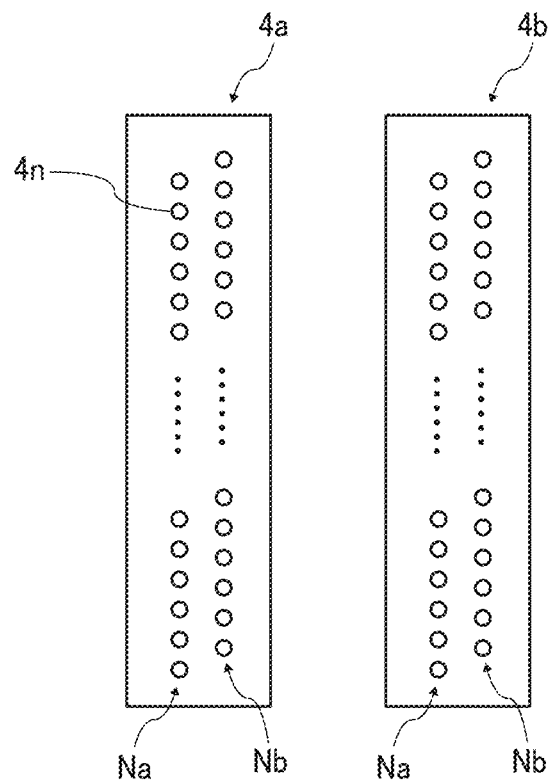
FIG. 3 is a diagram illustrating an example of the configuration of a nozzle plate wiped by a wiping member.

As illustrated in FIG. 3, the print head 4 has two nozzle arrays Na and Nb, each including the nozzles 4n.

As the liquid discharging head constituting the print head 4, it is possible to use a piezoelectric actuator such as a piezoelectric element and a thermal actuator that utilizes the phase change caused by film boiling of liquid by using an electric heat conversion element such as a heat element.

The liquid discharging device has a conveyor belt 12 as a conveyance device for conveying a sheet 10 by electrostatic adsorption at the position facing the printing head 4. The conveyor belt 12 employs an endless form and stretched around a conveyor roller 13 and a tension roller 14.

The conveyor belt 12 moves around in the sub-scanning direction by the conveyor roller 13 rotationally driven by a sub-scanning motor 16 via a timing belt 17 and a timing pulley 18. A charging roller charges this conveyor belt 12 while the conveyor belt 12 is circulating.

On one end in the main-scanning direction of the carriage 3, a maintenance and recovery mechanism 20 is disposed lateral to the conveyor belt 12. The maintenance and recovery mechanism 20 includes a cleaning device for maintenance and recovery of the print head 4. On the other end, a dummy discharging receiver 21 for receiving dummy discharging from the print head 4 is disposed lateral to the conveyor belt 12.

The maintenance and recovery mechanism 20 includes, for example, a capping member 20a for capping the nozzle forming surface (on which the nozzle is formed) of the print head 4, a wiping assembly 20b for wiping the nozzle forming surface, and a dummy discharging receiver for receiving droplets not used for image forming.

In addition, an encoder scale 23 forming a particular pattern is tensioned between both side plates along the main-scanning direction of the carriage 3. The carriage 3 has an encoder sensor 24 including a transmission photosensor for reading the pattern of the encoder scale 23. These encoder scale 23 and encoder sensor 24 constitute a linear encoder, main scanning encoder, for detecting the movement of the carriage 3.

A code wheel 25 is mounted onto the shaft of the conveyor roller 13. An encoder sensor 26 having a transmissive photosensor is disposed to detect a pattern formed on the code wheel 25. These code wheel 25 and encoder sensor 26 constitute a rotary encoder (sub-scanning encoder) for detecting the moving and the position of the conveyor belt 12.

In the liquid discharging device having such a configuration, the sheet 10 is fed from a sheet feeder tray, adsorbed to the conveyor belt 12, and conveyed along the sub-scanning direction in accordance with the rotation of the conveyor belt 12.

Thereafter, the print head 4 is driven and prints an image onto the sheet 10 standing still in an amount corresponding to a single line by discharging ink droplets in response to image signals while moving the carriage 3 in the main-scanning direction. The next line image is then printed after the sheet 10 is conveyed in a predetermined amount.

On receiving a signal indicating that the printing completes or the rear end of the sheet has reached the image printing region, the printing operation finishes and the sheet 10 is ejected to a sheet ejection tray.

In addition, the carriage 3 is moved in the printing (recording) standby mode to the maintenance and recovery mechanism 20 to clean the print head 4 by the maintenance and recovery mechanism 20. Alternatively, the maintenance and recovery mechanism 20 can be moved instead of moving the print head 4 to clean the print head 4.

As illustrated in FIG. 3, the print head 4 illustrated in FIG. 2 has two nozzle arrays Na and Nb, each including multiple nozzles 4n. The nozzle array Na of the print head 4a discharges black (K) liquid droplets and the other nozzle array Nb discharges cyan (C) liquid droplets. The nozzle array Na of the print head 4b discharges magenta (M) liquid droplets and the other nozzle array Nb discharges yellow (Y) liquid droplets.

In addition to those colors, the ink includes white ink, metallic ink, ant other color ink. For example, ink container 210y, 210m, 210c, and 210k, referred to as ink container 210, if not distinguished, of each color are detachably attached to a cartridge insertion unit 204. The color or the number of colors of ink is not limited to the mentioned above but can be suitably changed to suit to a particular application. The ink container 210 may contain white ink, metallic ink, and other color ink. A supply pump unit 224 replenishes each color ink to the head 4 from the ink container 210 via a supply tube.

The nozzle surface of the liquid discharging head in a liquid discharging device is cleaned during cleaning the liquid discharging head. This cleaning includes applying cleaning liquid to the nozzle surface of a liquid discharging head, also referred to as cleaning liquid applying. The cleaning preferably includes wiping the nozzle surface of a liquid discharging head with a wiping member to which the cleaning liquid is applied. The cleaning may furthermore optionally include other processes.

The cleaning liquid is described later.

The cleaning device for use in the present disclosure cleans the nozzle of the liquid discharging head in a liquid discharging device. It includes a wiping device for wiping the nozzle surface of the liquid discharging head with a wiping member to which the cleaning liquid is applied or a wiping device for wiping the nozzle surface to which the cleaning liquid is applied. The cleaning device may furthermore optionally include other devices.

The cleaning liquid is directly applied to the nozzle surface of a liquid discharging head through a cleaning liquid applying nozzle. It is also possible to wipe the nozzle surface of the liquid discharging head to which the cleaning liquid is applied or wipe the nozzle surface with a wiping member to which the cleaning liquid is applied. It is preferable to wipe the nozzle surface using a pressing member for pressing the nozzle surface via the wiping member.

The liquid discharging device may include a pressing member. It is not particularly limited as long as the member can press the nozzle surface via the wiping member and can be suitably selected to suit to a particular application. Specific examples include, but are not limited to, a pressing roller, a combination of a pressing roller and a pressing belt, a wiper, and a blade. Of these, a pressing roller is preferable.

The cleaning liquid applying device has no particular limit and can be suitably selected to suit to a particular application as long as the cleaning liquid can be applied in a constant amount. For example, nozzles, sprays, dispensers, and applicators can be used.

The wiping member has no specific limit and can be suitably selected to suit to a particular application. For example, unwoven fabric and cloth can be used. An item rolled up in a roll-like form is preferable. Unwoven fabric having a roll-like form is preferable because it is highly reliable and does not readily produce dust.

The liquid discharging device may dispense with a liquid discharging applying device when a wiping device is impregnated in cleaning liquid in advance.

It is preferable to control the amount of the cleaning liquid supplied by the discharging time (printing time). It is more preferable in this case to select the amount from multiple set values. The values are, for example, pressure, number of supplies, and number of nozzles.

It is preferable to control the amount of the cleaning liquid by a pressure applied to a cleaning liquid applying nozzle as a cleaning liquid applying device. If the cleaning liquid mentioned above is applied through multiple cleaning liquid applying nozzles, it is preferable to control the amount by the number of the cleaning liquid applying nozzles. Moreover, it is preferable to control the amount of the cleaning liquid applied to the wiping member by the number of application of the cleaning liquid from the cleaning liquid applying nozzle.

The wiping includes wiping the nozzle surface with the wiping member to which the cleaning liquid is applied. The wiping device preferably wipes the surface with the member.

The method of wiping the nozzle surface with the wiping member to which the cleaning liquid is applied has no particular limit and can be suitably selected to suit to a particular application. One way of wiping is to press unwoven fabric as a wiping member to which the cleaning liquid is applied against the nozzle surface of a liquid discharging head by a pressing roller as a pressing member.

The other processes and the other devices include, for example, a control process and a control device.

Specific examples of the devices include equipment such as a sequencer and a computer.

Figure 4:
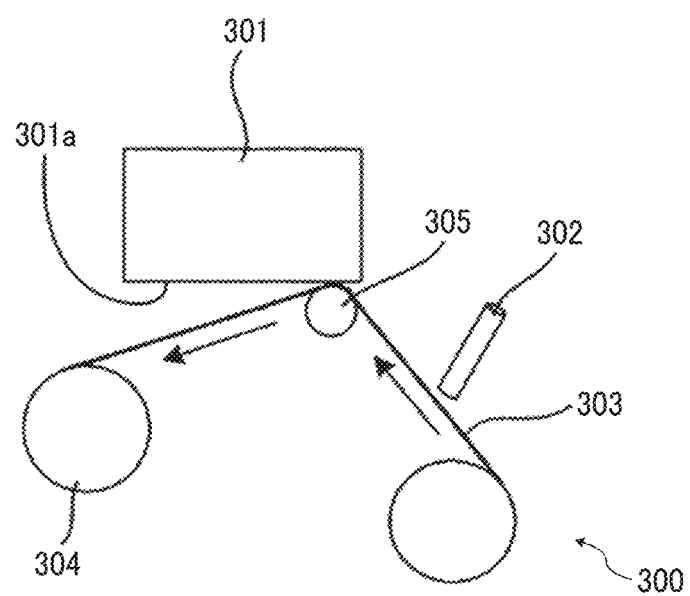
FIG. 4 is a schematic diagram illustrating an example of a cleaning device of the discharging device according to an embodiment of the present disclosure.

FIG. 4 is a schematic diagram illustrating an example of the cleaning device for use in the present disclosure. A wiping device 300 illustrated in FIG. 4 cleans a nozzle surface 301a on the ink discharging side of the nozzle plate of a liquid discharging head 301.

The cleaning device 300 includes an unwoven fabric 303 as a wiping member, a cleaning liquid applying nozzle 302 as a cleaning liquid applying device, a pressing roller 305 as a pressing member, and a reeling roller 304 for reeling the unwoven fabric after the wiping.

The cleaning liquid is supplied from a cleaning liquid tank via a cleaning liquid supply tube. The cleaning liquid is applied from the cleaning liquid applying nozzle 302 to the unwoven fabric 303 in an amount in accordance with the printing time by driving a pump disposed in the middle of the cleaning liquid supply tube. The unwoven fabric 303 is rolled up in a roll-like form.

As illustrated in FIG. 4, the nozzle surface 301a of the liquid discharging head 301 is cleaned with the unwoven fabric 303 to which the cleaning liquid is applied while the pressing roller 305 presses the fabric against the nozzle surface 301a in a contact manner. After the wiping is complete, the reeling roller 304 reels the unwoven fabric 303.

It is possible to provide multiple cleaning liquid applying nozzles 302. The nozzles receive pressure based on the control by a device for controlling a cleaning liquid application pressure. The amount of the cleaning liquid applied can be adjusted by suitably changing the pressure. Alternatively, based on the control, the amount of cleaning liquid is changeable by changing the number of nozzles. Moreover, based on the control, it is possible to adjust the amount of cleaning liquid by changing the number of applications of the cleaning liquid.

The method of cleaning the nozzle surface of a liquid discharging head on the side of liquid discharging is as follows.

The cleaning liquid is directly applied to the nozzle surface of a liquid discharging head through a cleaning liquid applying nozzle followed by a wiping member wiping the nozzle surface. The cleaning liquid applying nozzle receives pressure when wiping with a wiping member containing the cleaning liquid.

The amount of the cleaning liquid applied can be adjusted by changing the pressure. Alternatively, it is possible to adjust the amount by changing the number of the nozzles of the cleaning liquid applying nozzles for use in applying the liquid, or changing the number of applications of the cleaning liquid through the nozzles. In this manner, the nozzle surface after printing is wiped with the wiping member to which the cleaning liquid is applied.

The liquid discharging device 100 may furthermore include a fixing unit for heat-fixing an image formed on the printing medium M. The fixing unit is not particularly limited. A specific example is a fixing roller. It is preferable to heat-fix an image formed on the printing medium M at a temperature range of from 50 to 150 degrees C. and preferably from 100 to 150 degrees C.

Cleaning Liquid

The cleaning liquid may contain water, a surfactant, and an organic solvent.

Specific examples of the surfactant include, but are not limited to, a fluorochemical surfactant, amphoteric surfactant, anionic surfactant, nonionic surfactants, and hydrocarbon-based surfactant. These can be used alone or in combination to suit to a particular application. Hydrocarbon-based surfactants are preferable to achieve good cleanability and storage stability. The proportion of a hydrocarbon-based surfactant in cleaning liquid is preferably from 0.5 to 2.0 percent by mass and more preferably from 0.5 to 1 percent by mass to enhance the liquid contact property to a wiping member or the nozzle surface of a liquid discharging head.

In this range, the cleaning liquid does not readily permeate a wiping member and the nozzle surface of a liquid discharging head, which in general leads to degradation of the cleaning power. However, this range has an advantage of preventing a wiping member and the nozzle surface from deteriorating.

The cleaning liquid used with the ink of the present disclosure does not readily permeate a wiping member and the nozzle surface of a liquid discharging head and is likely to cover ink film with good permeation.

The combination of the ink of the present disclosure and the cleaning liquid efficiently clean the ink while minimizing the degradation of a wiping member and the nozzle surface of a liquid discharging head.

Specific examples of the hydrocarbon-based surfactant include, but are not limited to, EMULGEN LS-106, EMULGEN LS-110, and SOFTANOL EP7025.

The cleaning liquid preferably has a lower static surface tension than the ink does in terms of the wiping property. It is more preferable that the contact angle of the cleaning liquid against ink film formed on a non-permeable printing medium by the image forming method described later be from 15 to 20 degrees.

Post-Processing Fluid

The post-processing fluid mentioned above may contain water, a surfactant, an organic solvent, resin, and other optional additives to suit to a particular application.

Specific examples of the surfactant include, but are not limited to, a fluorochemical surfactant, amphoteric surfactant, anionic surfactant, nonionic surfactants, and hydrocarbon-based surfactant. These can be used alone or in combination to suit to a particular application. Since water against film of the ink mentioned above has a contact angle of 60 degrees or less, the post-processing fluid covers the film and maintains a high level of glossiness even if the amount of the surfactant in processing fluid is reduced. The proportion of a surfactant in post-processing fluid is preferably from 0.05 to 2.0 percent by mass.

At a proportion of not greater than 1.0 percent by mass, the post-processing fluid is unlikely to sufficiently cover ink film, resulting in increasing the dot height; however, the post-processing fluid used with the ink of the present disclosure in combination covers the film well in terms of practical purpose even if the fluid alone does not readily cover it.

The type of the resin has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins. The proportion of resin in the post-processing fluid is preferably 5 percent by mass or more to enhance the abrasion resistance of the ink mentioned above having a high hydrophilicity. The proportion is preferably 30 percent by mass or less in terms of the discharging performance. The resin is more preferably contains urethane or acrylic resin to further enhance the abrasion resistance.

Recording Medium

The non-permeable printing medium is not particularly limited and can be suitably selected to suit to a particular application. Examples are plastic film, a building material, and metal.

Specific examples include, but are not limited to, polycarbonate film, vinyl chloride resin film, polypropylene film, polyethylene terephthalate (PET) film, nylon film, and polyethylene film. Of these, polypropylene film, polyethylene terephthalate film, and nylon film are preferable in terms of adhesion.

A specific example of the polypropylene film is biaxially oriented polypropylene (OPP) film. Specific examples of the building material include, but are not limited to, wallpaper, a floor material, tile, ceramics, and glass. These can be used alone or in combination.

The non-permeable printing medium can be procured. There is no specific limitation to the procurable product and it can be suitably selected to suit to a particular application.

Specific examples include, but are not limited to, polypropylene film (P-2002, manufactured by TOYOBO CO., LTD.), polypropylene film (P-2161, manufactured by TOYOBO CO., LTD.), polypropylene film (PA-4166, manufactured by TOYOBO CO., LTD.), polypropylene film (PA-20, manufactured by SUNTOX Corporation), polypropylene film (PA-30, manufactured by SUNTOX Corporation), polypropylene film (PA-20W, manufactured by SUNTOX Corporation), polypropylene film (FOA, manufactured by Futamura Chemical Co., Ltd.), polypropylene film (FOS, manufactured by Futamura Chemical Co., Ltd.), polypropylene film (FOR, manufactured by Futamura Chemical Co., Ltd.), polyethylene terephthalate film (E-5100, manufactured by Toyobo Co., Ltd.), polyethylene terephthalate film, polyethylene terephthalate film (E-5102, manufactured by Toyobo Co., Ltd.), polyethylene terephthalate film (P60, manufactured by Toray Industries, Inc.), polyethylene terephthalate film (P375, manufactured by Toray Industries, Inc.), polyethylene terephthalate film (G2, manufactured by Teijin DuPont Films Japan Limited), polyethylene terephthalate film (G2P2, manufactured by Teijin DuPont Films Japan Limited), polyethylene terephthalate film (K, manufactured by Teijin DuPont Films Japan Limited), polyethylene terephthalate film (SL, manufactured by Teijin DuPont Films Japan Limited), nylon film (Harden film N-1100, manufactured by Toyobo Co., Ltd.), nylon film (Harden film N-1102, manufactured by Toyobo Co., Ltd.), nylon film (Harden film N-1200, manufactured by TOYOBO CO., LTD.), nylon film (ON, manufactured by UNITIKA LTD.), nylon film (NX, manufactured by UNITIKA LTD.), nylon film (MS, manufactured by UNITIKA LTD.), and nylon film (NK, manufactured by UNITIKA LTD.).

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Preparation Examples, Manufacturing Examples, Examples, and Comparative Examples but are not limited thereto.

In Examples, "parts" and "percent" are "parts by mass" and "percent by mass" unless otherwise specified.

Unless otherwise specified, the inks were prepared and evaluated under the conditions of room temperature of 25 degrees C. and humidity of 60 percent.

The components, products, and manufacturers for use in Examples and Comparative Examples are shown in Table 1,

TABLE 1

| Component | | Product and Manufacturer |
|---|---|---|
| Water-dispersible Resin | Urethane resin A (Tg: 41 degrees C.) | SUPERFLEX$^{registered}$ 210, manufactured by DKS Co., Ltd. |
| | Urethane resin B (Tg: −10 degrees C.) | SUPERFLEX$^{registered}$ 420, manufactured by DKS Co., Ltd. |
| | Acrylic resin A (Tg: 12 degrees C.) | VONCOAT CF-6140, manufactured by DIC Corporation |
| | Styrene acrylic resin A (Tg: 50 degrees C.) | Vinyblan 2685, manufactured by Nissin Chemical co., ltd. |
| | Polyester resin A (Tg: 67 degrees C.) | ELITELregisteredKA-5034, manufactured by UNITIKA LTD. |
| Water-soluble organic solvent | 1,2-propane diol | Manufactured by ADEKA CORPORATION |
| | 1,2-butanediol | Manufactured by Tokyo Chemical Industry Co, Ltd. |
| | 3-methoxy-3-methyl-1-butanol | Manufactured by KURARAY CO , LTD. |
| | 2-ethyl-1,3-hexanediol | Manufactured by Wako Pure Chemical Industries, Ltd. |
| | 3-methoxy-N,N-dimethyl propaneamide | Manufactured by Mitsui Chemicals, Inc. |
| | 3-n-butoxy-N,N-dimethyl propaneamide | Manufactured by Mitsui Chemicals, Inc. |
| Surfactant, compound represented by Chemical Formula 1 | Polyoxyalkylene alkyl ether | HW-1000, manufactured by The Dow Chemical Company |
| Surfactant | Polyether-modified siloxane compound | TEGO Wet 270, manufactured by Evonik Industries AG |
| | Polyether-modified siloxane compound | SILFACE SAG503A, manufactured by Nisshin Chemical Industry Co., Ltd. |
| | Fluorochemical surfactant | FS-3100, manufactured by The Chemours Company |
| | Alkylene glycol surfactant | EMULGEN LS-106, manufactured by Kao Corporation |
| | Alkylene glycol surfactant | EMULGEN LS-110, manufactured by Kao Corporation |
| | Alkylene glycol surfactant | SOFTANOL EP7025, manufactured by Nissin Chemical Industry Co., Ltd. |
| | Silicone surfactant | TEGO Wet-240, manufactured by Evonik Industries AG |

TABLE 1-continued

| Component | | Product and Manufacturer |
|---|---|---|
| Mildew-proofing agent | Proxel GXL | PROXEL GXL, manufactured by AVECIA GROUP |
| Defoaming agent | 2,4,7,9-tetramethyl decane-4,7-diol | Manufactured by Nissin Chemical co., ltd. |
| | 2,5,8,11-tetramethyldodecane-5,8-diol | Manufactured by Nissin Chemical co., ltd. |
| pH regulator | 2-amino-2-ethyl-1,3-propane diol | Manufactured by Mitsui Chemicals, Inc. |
| | Aqueous solution of sodium hydroxide at 20 percent | Manufactured by Kanto Chemical Co., Inc. |

Preparation of Pigment Dispersion

Preparation Example 1: Preparation of Surface Reformed Black Pigment Dispersion

A total of 100 g of Black Pearls® 1000, carbon black having a BET specific surface area of 343 m²/g and an absorbency of dibutylphthalate (DBPA) of 105 ml/100 g, manufactured by Cabot Corporation, 100 millimole of sulfanilic acid, and 1 litter of highly deionized water were mixed by a Silverson Mixer at 6,000 rpm in a room temperature environment. Thereafter, 100 millimole of nitric acid was added to the slurry obtained. Thirty minutes later, 100 millimole of sodium nitrite dissolved in a 10 mL of highly deionized water was gradually added. Furthermore, the resulting material was heated to 60 degrees C. while being stirred to allow reaction for one hour to obtain a reformed pigment in which sulfanilic acid was added to carbon black. Next, pH of the product was adjusted to 9 with 10 percent tetrabutyl ammonium hydroxide solution (methanol solution) to obtain a reformed pigment dispersion in 30 minutes. Thereafter, the dispersion obtained and highly deionized water were subjected to ultrafiltering by dialysis membrane followed by ultrasonic dispersion to obtain a surface reformed black pigment dispersion having a solid content of 20 percent by mass. The surface treatment level of the pigment was 0.75 millimole/g and the median size ($D_{50}$) was 120 nm as measured by a particle size distribution measuring instrument, NANOTRAC UPA-EX150, manufactured by NIKKISO CO., LTD.

Preparation Example 2: Preparation of Resin-Coated Black Pigment Dispersion

Preparation of Polymer Solution
After replacement with nitrogen gas in a IL flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were mixed and heated to 65 degrees C. in the flask.
Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobismethyl valeronitrile, and 18 g of methylethyl ketone was added dropwise to the flask in two and a half hours. Subsequently, a liquid mixture of 0.8 g of azobismethyl valeronitrile and 18 g of methylethyl ketone was added dropwise to the flask in half an hour. After one-hour aging at 65 degrees C., 0.8 g of azobismethyl valeronitrile was added followed by aging for another hour. After the reaction was complete, 364 g of methylethyl ketone was added to the flask to obtain 800 g of a polymer solution A having a concentration of 50 percent by mass.

Preparation of Resin-Coated Dispersion
A total of 28 g of the polymer solution A, 42 g of carbon black, FW100, manufactured by Degussa AG, 13.6 g of 1 mol/l potassium hydroxide aqueous solution, 20 g of methylethyl ketone, and 13.6 g of deionized water were sufficiently stirred followed by mixing and kneading using a roll mill. The paste obtained was placed in 200 g of pure water followed by sufficient stirring. Methylethyl ketone and water were distilled away using an evaporator followed by filtration under pressure with a polyvinylidene fluoride membrane filter having an average pore diameter of 5.0 μm to remove coarse particles. Consequently, a liquid dispersion of resin-coated black pigment dispersion containing a pigment at 15 percent by mass and a solid content at 20 percent by mass was obtained. The median size (D50) of the resin-coated black pigment in the resin-coated black pigment dispersion obtained was 127 nm. The median size (D50) was measured with a particle size distribution measuring instrument, NANOTRAC UPA-EX-150, manufactured by NIKKISO CO., LTD.

Preparation Example 3: Preparation of Resin-Coated Cyan Pigment Dispersion

A resin-coated cyan pigment dispersion was prepared in the same manner as in the Preparation Example 2 except that carbon black as the pigment was changed to a phthalocyanine pigment. C.I. Pigment Blue 15:3.
The median size (D50) of the resin-coated cyan pigment in the resin-coated cyan pigment dispersion was 93 nm as measured with a particle size distribution measuring instrument, NANOTRAC UPA-EX150, manufactured by NIKKISO CO., LTD.

Preparation Example 4: Preparation of Resin-Coated Magenta Pigment Dispersion

A resin-coated magenta pigment dispersion was prepared in the same manner as in Preparation Example 2 except that carbon black as the pigment was changed to a magenta pigment, C.I. Pigment Red 122.
The median size (D50) of the resin-coated magenta pigment in the resin-coated cyan pigment dispersion was 76 nm as measured with a particle size distribution measuring instrument, NANOTRAC UPA-EX150, manufactured by NIKKISO CO., LTD.

Preparation Example 5: Preparation of Resin-Coated Yellow Pigment Dispersion

A liquid dispersion of resin-coated yellow pigment was prepared in the same manner as in the Preparation Example 2 except that carbon black as the pigment was changed to bisazo yellow pigment, C.I. Pigment Yellow 155.
The median size (D50) of the resin-coated yellow pigment in the resin-coated cyan pigment dispersion was 76 nm as measured with a particle size distribution measuring instrument, NANOTRAC UPA-EX150, manufactured by NIKKISO CO., LTD.

Preparation Example 6: Preparation of White Pigment Dispersion

A total of 25 g of titanium oxide, STR-100W, manufactured by Sakai Chemical Industry Co., Ltd., 5 g of pigment dispersant, TEGO Dispers 651, manufactured by Evonik Industries AG, and 70 g of water were mixed followed by dispersing for five minutes using a bead mill, Research Labo, manufactured by Shinmaru Enterprises Corporation, with zirconia beads having a diameter of 0.3 mm with a filling ratio of 60 percent at 8 m/s, so a white pigment dispersion having a volume average particle diameter of 285 nm was obtained.

Manufacturing Example of Ink

Example 1-1

Preparation of Ink I-1

A total of 15.0 parts of 1,2-propane diol, 10.0 parts of 3-methoxy-3-methyl-1-butanol, 1.50 parts of polyoxyalkylene alkylether. HW-1000, manufactured by The Dow Chemical Company, and 0.50 parts of a polyether-modified siloxane compound, TEGO Wet 270, manufactured by Evonik Industries AG were admixed and stirred in a container equipped with a stirrer for 30 minutes. Then, 0.05 parts of preservatives and fungicides, Proxel GXL, manufactured by Avecia Inkjet Limited, 0.50 parts of 2,4,7,9-tetramethyldecane-4,7-diol, 0.20 parts of 2-amino-2-ethyl-1,3-propane diol, 0.20 parts of aqueous solution of sodium hydroxide at 20 percent by mass, 15.0 parts of urethane resin A, SUPERFLEX® 210, manufactured by DKS Co., Ltd., 4.00 parts of the resin-coated black pigment dispersion of Preparation Example 2, and a balance of highly pure water to make the entire 100 parts were admixed and stirred for 60 minutes. Thereafter, the mixture obtained was filtered with a polyvinylidene fluoride membrane filter having an average pore diameter of 1.2 µm under pressure to remove coarse particles and dust to obtain Ink I-1 of Example 1-1.

Example 1-2

Preparation of Ink I-2

A total of 15.0 parts of 1,2-butane diol, 10.0 parts of 3-methoxy-N,N-dimethyl propanamide, 1.50 parts of polyoxyalkylene alkylether. HW-1000, manufactured by The Dow Chemical Company, and 0.50 parts of a polyether-modified siloxane compound, TEGO Wet 270, manufactured by Evonik Industries AG were admixed and stirred in a container equipped with a stirrer for 30 minutes. Then, 0.05 parts of preservatives and fungicides. Proxel GXL, manufactured by Avecia Inkjet Limited, 0.40 parts of 2,4, 7,9-tetramethyldecane-4,7-diol, 0.20 parts of 2-amino-2-ethyl-1,3-propane diol, 0.20 parts of aqueous solution of potassium hydroxide at 20 percent by mass, 10.0 parts of polyester resin A. ELITEL® KA-5034, manufactured by UNITIKA LTD., 4.00 parts of the surface-reformed black pigment dispersion of Preparation Example 1, and a balance of highly pure water to make the entire 100 parts were admixed and stirred for 60 minutes. Thereafter, the mixture obtained was filtered with a polyvinylidene fluoride membrane filter having an average pore diameter of 1.2 µm under pressure to remove coarse particles and dust to obtain ink 1-2 of Example 1-2.

Examples 1-3 to 1-9 and Comparative Examples 1-1 to 1-3

Preparation of Ink I-3 to 1-12

As in Example 1, the organic solvent, surfactant, and defoaming agent were mixed according to the prescription shown in Table 2 followed by admixing a preservatives and fungicides, pH regulator, resin, and pigment dispersion as colorant for stirring. The mixture obtained was filtered with a polyvinylidene fluoride membrane filter having an average pore diameter of 1.2 µm under pressure to remove coarse particles and dust to obtain inks I-1 to I-9 of Examples 1-3 to 1-9 and inks I-10 to I-12 of Comparative Examples 1-1 to 1-3.

Using inks I-1 to I-12 of Examples 1-3 to 1-9 and Comparative Examples 1-1 to 1-3, solid images were formed according to the following method. The contact angle of water against ink film and color unevenness were thereafter evaluated. The evaluation results are shown in Tables 2 and 5.

Evaluation

Forming Solid Image

In an environment of 22.5 to 23.5 degrees C. and 45 to 55 percent RH, using an inkjet printing device, IPSiO GXe-5500, manufactured by RICOH CO., LTD., the drive voltage of the piezo element was changed to discharge the same amount of ink in order to attach the same amount of the ink onto a printing medium, OK topcoat+, weight: 104.7 g/m², manufactured by OJI PAPER CO., LTD.

Contact Angle of Water Against Ink Film

Inks I-1 to I-12 were applied in an amount of 9 g/m² to a non-permeable printing medium. GIY-11Z5, manufactured by LINTEC Corporation, using a machine including the post-processing fluid applying unit 130 illustrated in FIG. 1 and the cleaning device 300 illustrated in FIG. 4, remodeled based on an inkjet printing device, IPSiO GXe-5500, manufactured by Ricoh Co., Ltd., followed by drying the ink at 80 degrees C. for 180 seconds with a hot plate to form ink film. The contact angle of the droplet was measured by viewing the state of the formed ink film from the horizon direction with an automatic contact angle meter, manufactured by Kyowa Interface Science Co., LTD. when a 0.2 µl single droplet of pure water was dripped to the film.

Color Unevenness

A solid image was printed on Lumi Art Gross 130 with the inks I-1 to I-12, selecting Gloss Paper, Clean Mode, No Color Calibration and it was visually evaluated regarding the density unevenness, i.e., beading.

Evaluation Criteria

A: None

B: Density unevenness is slightly recognized at a distance of 15 cm away

C: Density unevenness is slightly recognized at a distance of 30 cm away

D: Density unevenness is recognized at a distance of 50 cm away

Preparation of Cleaning Liquids W-1 to W-11

Each component was mixed and stirred for one hour according to the prescriptions shown in Table 3. Next, the resulting liquid was filtered to remove coarse particles using a polypropylene filter having an average pore diameter of 1.5 µm under pressure to prepare cleaning liquid W-1 to W-11.

Preparation of Post-Processing Fluids P-1 to P-8

Each component was mixed and stirred for one hour according to the prescriptions shown in Table 4. Next, the resulting liquid was filtered to remove coarse particles using a polypropylene filter having an average pore diameter of 1.5 μm under pressure to prepare post-processing fluid P-1 to P-8.

Examples 2-1 to 2-13 and Comparative Examples 2-1 to 2-9

Black solid images were formed according to the method described in Forming Solid Image using the combinations of the ink, cleaning liquid, and post-processing fluid of Examples 2-1 to 2-13 and Comparative Examples 2-1 to 2-9 shown in Table 5. The images were evaluated on the cleaning property, surface glossiness, abrasion resistance according to the evaluation method described below.

Regarding Examples and Comparative Examples, the permeability and cleaning property of the cleaning liquid to the inside of nozzles and the dischargeability of ink or post-processing fluid were evaluated according to the evaluation method described below.

Contact Angle of Cleaning Liquid Against Ink Film

The contact angle of cleaning liquid against ink film was evaluated as follows using the inks I-1 to I-5 and I-10 to I-12.

Ink was applied in an amount of 9 g/m² to a non-permeable printing medium, GIY-11Z5, manufactured by LINTEC Corporation, using a machine including the post-processing fluid applying unit 130 illustrated in FIG. 1 and the cleaning device 300 illustrated in FIG. 4, remodeled based on an inkjet printing device, IPSiO GXe-5500, manufactured by Ricoh Co., Ltd., followed by drying the inks at 80 degrees C. for 180 seconds with a hot plate to form ink film. The contact angle of the droplet was measured by viewing the state of the formed ink film from the horizon direction with an automatic contact angle meter, manufactured by Kyowa Interface Science Co., LTD. when a 0.2 μl single droplet of cleaning liquid was dripped to the film.

The results are shown in Table 5.

Surface Tension

The static surface tension of the inks I-1 to 1-12 and the cleaning liquids W-1 to W-11 was measured at 25 degrees C. using an automatic surface tensiometer, DY-300, manufactured by KYOWA INTERFACE SCIENCE Co., Ltd.

The measuring results of the static surface tension of the inks are shown in Table 2 and those of the cleaning liquids are shown in Table 3.

Evaluation of Permeability of Cleaning Liquid to Inside of Nozzle

Black ink was applied for 15 minutes using a machine including the post-processing fluid applying unit 130 illustrated in FIG. 1 and the cleaning device 300 illustrated in FIG. 4, remodeled based on an inkjet printing device, IPSiO GXe-5500, manufactured by Ricoh Co., Ltd., followed by wiping the nozzle surface of the liquid discharging head with unwoven fabric, Clean Wiper Anticon® GOLD, polyester long fiber, manufactured by Harada Corporation, which was impregnated with 100 μl of each cleaning liquid using the cleaning device illustrated in FIG. 4. Immediately thereafter, 500 droplets of the ink were discharged through the nozzles to super fine paper, manufactured by Seiko Epson Corporation. The density of dots were visually checked and the number of dots was counted until it reached the same as before wiping the nozzle surface of the head. It was evaluated regarding the permeability of the cleaning liquid to the inside of nozzles according to the following criteria. As the number of dots decreases, the cleaning liquid is difficult to permeate into nozzles, which means the degradation of the nozzle surface attributable to contact with liquid is prevented. That is, it is successful to prevent the degradation of image density.

The evaluation results are shown in Table 5.

Evaluation Criteria

A: number of dots is less than 10
B: Number of dots is from 10 to less than 30
C: Number of dots is 30 or more
D: Defective discharging Cleaning Property According to the method described in Unexamined Japanese Patent Application Publication No. 2018-069730, the cleaning power of the cleaning liquid was evaluated. Black ink was continuously discharged for 45 minutes using a machine including the post-processing fluid applying unit 130 illustrated in FIG. 1 and the cleaning device 300 illustrated in FIG. 4, remodeled based on an inkjet printing device, IPSiO GXe-5500, manufactured by Ricoh Co., Ltd. Twelve hours after the discharging ceased, the nozzle surface of the liquid discharging head was wiped with unwoven fabric, Clean Wiper Anticon® GOLD, polyester long fiber, manufactured by Harada Corporation, which was impregnated with 50 μl of each cleaning liquid, using the cleaning device illustrated in FIG. 4. Thereafter, the cleaning power was evaluated based on the following evaluation criteria The evaluation results are shown in Table 5.

Evaluation Criteria

A: Ink dirt completely wiped off
B: Wiping remnant of ink dirt was less than 10 percent but no remnant around nozzle present
C: Wiping remnant of ink dirt was less than 10 percent and remnant around nozzle present
D: Wiping remnant of ink dirt was 10 percent or greater Surface Glossiness Black ink was applied to a non-permeable printing medium, GIY-11Z5, manufactured by LINTEC Corporation, to form a 4 cm×4 cm solid image using a machine including the post-processing fluid applying unit 130 illustrated in FIG. 1 and the cleaning device 300 illustrated in FIG. 4, remodeled based on an inkjet printing device, IPSiO GXe-5500, manufactured by Ricoh Co., Ltd., followed by applying the post-processing fluid to the solid image in an amount of 9 g/m², to evaluate the surface glossiness according to the following evaluation criteria.

The evaluation results are shown in Table 5.

Evaluation Criteria

A: Very high glossiness
B: Glossiness present
C: No glossiness present

Abrasion Resistance

Black ink was applied to a non-permeable printing medium, GIY-11Z5, manufactured by LINTEC Corporation, to form a 4 cm×4 cm solid image using a machine including the post-processing fluid applying unit 130 illustrated in FIG. 1 and the cleaning device 300 illustrated in FIG. 4, remodeled based on an inkjet printing device, IPSiO GXe-5500, manufactured by Ricoh Co., Ltd., followed by discharging the post-processing fluid to the image. Twenty-four hours after the printing, white cotton cloth, JISL 0803 cotton No. 3, was attached to an abrader with a double-sided adhesive form tape, #4016 t=1.6, manufactured by 3M Company using a clock meter, CM-1 type, and the abrader was moved back and forth five times on the image. The density of the coloring material that attached to the cotton cloth was measured with a spectrophotometer, Model-938, manufactured by X-Rite Inc.

The evaluation results are shown in Table 5.

Evaluation Criteria
A: Density of coloring material that attached to cotton cloth was less than 0.05
B: Density of coloring material that attached to cotton cloth was from 0.05 to less than 0.1
C: Density of coloring material that attached to cotton cloth was 0.1 or greater Dischargeability of Ink or Post-Processing Fluid The dischargeability of ink or post-processing fluid was evaluated using the black ink of Examples 1-1 to 1-5 and Comparative Examples 1-1 to 1-3 and the post-processing fluids P-1 to P-8 according to the following method.

The initial filling of ink was conducted using a machine including the post-processing fluid applying unit 130 illustrated in FIG. 1 and the cleaning device 300 illustrated in FIG. 4, remodeled based on an inkjet printing device, IPSiO GXe-5500, manufactured by Ricoh Co., Ltd. Thereafter, the nozzle check pattern was printed to check discharging defects such as non-discharging and curving of discharging. Printing was then conducted on MyPaper through the nozzle free of discharging defects.

The printing pattern had a print area of 5 percent in the entire sheet area with an ink of 100 percent duty.

The print conditions were that the printing density was 360 dpi with one pass printing. The chart was continuously printed 20 times followed by downtime of 20 minutes without discharging. This cycle was repeated 50 times until the chart was printed on 1,000 sheets in total. The nozzle check pattern was then printed to check the discharging defects of ink or post-processing fluid. For each nozzle check pattern, the dot omission and disturbed discharging were visually checked, The evaluation results are shown in Table 5.

Evaluation Criteria
A: No disturbed discharging
B: Slight disturbed discharging
C: Disturbed discharging or no discharging
D: Significant disturbed discharging or many non-discharging nozzles

TABLE 2

| Component (percent by mass) | | Example 1-1 | Example 1-2 | Example 1-3 | Example 1-4 |
|---|---|---|---|---|---|
| | | Ink No. | | | |
| | | I-1 | I-2 | I-3 | I-4 |
| Pigment dispersion | Resin-coated black pigment dispersion | 4 | | 4 | 4 |
| | Resin-coated cyan pigment dispersion | | | | |
| | Resin-coated magenta pigment dispersion | | | | |
| | Resin-coated yellow pigment dispersion | | | | |
| | Whitepigment dispersion | | | | |
| | Surface reformed black pigment dispersion | | 4 | | |
| Water-dispersible resin | Urethane resin A | 15 | | | |
| | Acrylic resin A | | | | |
| | Styrene acrylic resin A | | | | |
| | Polyester resin A | | 10 | 10 | 10 |
| Organic solvent | 1,2-propanediol | 15 | | | |
| | 1,2-butanediol | | 15 | 15 | 15 |
| | 3-methoxy-3-methyl-l-butanol | 10 | | | |
| | 2-ethyl-1,3-hexanediol | 3 | | 2 | 2 |
| | 3-methoxy-N,N-dimethyl propaneamide | | 10 | | |
| | 3-n-butoxy-N,N-dimethyl propaneamide | | | | 12 |
| Surfactant | HW-1000 | 1.5 | 1.5 | 2 | 0.3 |
| | TEGO Wet270 | 0.5 | 0.5 | | |
| | SILFACE SAG503A | | | 1 | 2 |
| | FS-3100 | | | | |
| Preservative | Proxel GXL | 0.05 | 0.05 | 0.05 | 0.05 |
| Defoaming agent | 2,4,7,9-tetramethyl decane-4,7-diol | 0.5 | 0.4 | 0.4 | |
| | 2,5,8,11-tetramethyldodecane-5,8-diol | | | | 0.4 |
| pH | 2-amino-2-ethyl-1,3-propane diol | 0.2 | 0.2 | 0.2 | 0.6 |

TABLE 2-continued

|  |  |  |  |  |  |
|---|---|---|---|---|---|
| regulator | Aqueous solution of sodium hydroxide at 20 percent by mass |  | 0.2 | 0.2 |  |
|  | Aqueous solution of sodium hydroxide at 20 percent | 0.2 |  |  |  |
| Pure water |  | 50.05 | 58.15 | 65.15 | 53.65 |
| Total (percent by mass) |  | 100 | 100 | 100 | 100 |
| Evaluation | Static surface tension of ink (mN/m) | 23.2 | 23.1 | 23.5 | 23.5 |
|  | Contact angle (degrees) of water against ink film | 52 | 57 | 57 | 60 |
|  | Color unevenness (grade) | A | B | B | B |

|  |  | Example 1-5 | Example 1-6 | Example 1-7 | Example 1-8 |
|---|---|---|---|---|---|
|  |  | Ink No. | | | |
| Component (percent by mass) |  | I-5 | I-6 | I-7 | I-8 |
| Pigment dispersion | Resin-coated black pigment dispersion | 4 |  |  |  |
|  | Resin-coated cyan pigment dispersion |  |  |  |  |
|  | Resin-coated magenta pigment dispersion |  |  | 4 |  |
|  | Resin-coated yellow pigment dispersion |  |  |  | 4 |
|  | Whitepigment dispersion |  |  |  |  |
|  | Surfacereformed blackpigment dispersion |  |  |  |  |
| Water-dispersible resin | Urethane resin A |  | 15 |  |  |
|  | Acrylic resin A |  |  |  |  |
|  | Styrene acrylic resin A |  |  | 15 | 15 |
|  | Polyester resin A | 10 |  |  |  |
| Organic solvent | 1,2-propanediol |  |  |  |  |
|  | 1,2-butanediol | 15 | 15 | 15 | 15 |
|  | 3-methoxy-3-methyl-1-butanol |  | 12 | 12 | 12 |
|  | 2-ethyl-1,3-hexanediol | 2 | 1 | 1 | 1 |
|  | 3-methoxy-N,N-dimethyl propaneamide |  |  |  |  |
|  | 3-n-butoxy-N,N-dimethyl propaneamide | 12 |  |  |  |
| Surfactant | HW-1000 | 1 | 2 | 2 | 2 |
|  | TEGO Wet270 |  |  | 1 | 1 |
|  | SILFACE SAG503A |  |  |  |  |
|  | FS-3100 | 1 | 1 |  |  |
| Preservative | Proxel GXL | 0.05 | 0.05 | 0.05 | 0.05 |
| Defoaming agent | 2,4,7,9-tetramethyl decane-4,7-diol | 0.4 | 0.4 | 0.4 | 0.4 |
|  | 2,5,8,11-tetramethyldodecane-5,8-diol |  |  |  |  |
| pH regulator | 2-amino-2-ethyl-1,3-propane diol | 0.6 | 0.2 | 0.2 | 0.2 |
|  | Aqueous solution of sodium hydroxide at 20 percent by mass |  |  |  |  |
|  | Aqueous solution of sodium hydroxide at 20 percent |  | 0.05 | 0.1 | 0.1 |
| Pure water |  | 53.95 | 49.3 | 49.25 | 49.25 |
| Total (percent by mass) |  | 100 | 100 | 100 | 100 |
| Evaluation | Static surface tension of ink (mN/m) | 24.0 | 24.0 | 23.0 | 23.0 |
|  | Contact angle (degrees) of water against ink film | 60 | 58 | 58 | 58 |
|  | Color unevenness (grade) | A | A | A | A |

TABLE 2-continued

|  |  | Example 1-9 | Comparative Example 1-1 | Comparative Example 1-2 | Comparative Example 1-3 |
|---|---|---|---|---|---|
|  |  |  | Ink No. |  |  |
| Component (percent by mass) |  | I-9 | I-10 | I-11 | I-12 |
| Pigment dispersion | Resin-coated black pigment dispersion |  | 4 | 4 | 4 |
|  | Resin-coated cyan pigment dispersion |  |  |  |  |
|  | Resin-coated magenta pigment dispersion |  |  |  |  |
|  | Resin-coated yellow pigment dispersion |  |  |  |  |
|  | White pigment dispersion | 7 |  |  |  |
|  | Surface reformed black pigment dispersion |  |  |  |  |
| Water-dispersible resin | Urethane resin A |  |  |  |  |
|  | Acrylic resin A |  | 20 |  |  |
|  | Styrene acrylic resin A | 15 |  | 15 |  |
|  | Polyester resin A |  |  |  | 10 |
| Organic solvent | 1,2-propanediol |  | 15 | 15 |  |
|  | 1,2-butanediol | 15 |  |  | 15 |
|  | 3-methoxy-3-methyl-1-butanol | 12 | 10 | 12 | 10 |
|  | 2-ethyl-1,3-hexanediol | 1 | 1 | 1 | 1 |
|  | 3-methoxy-N,N-dimethyl propaneamide |  |  |  |  |
|  | 3-n-butoxy-N,N-dimethyl propaneamide |  |  |  |  |
| Surfactant | HW-1000 | 2 |  |  | 2 |
|  | TEGO Wet270 | 1 | 2 | 7 |  |
|  | SILFACE SAG503A |  | 1 |  |  |
|  | FS-3100 |  |  | 1 |  |
| Preservative | Proxel GXL | 0.05 | 0.05 | 0.05 | 0.05 |
| Defoaming agent | 2,4,7,9-tetramethyl decane-4,7-diol | 0.4 |  |  | 0.4 |
|  | 2,5,8,11-tetramethyldodecane-5,8-diol |  | 0.4 | 0.4 |  |
| pH regulator | 2-amino-2-ethyl-1,3-propane diol | 0.2 | 0.1 | 0.4 | 0.2 |
|  | Aqueous solution of sodium hydroxide at 20 percent by mass |  |  |  |  |
|  | Aqueous solution of sodium hydroxide at 20 percent | 0.1 | 0.02 |  |  |
| Pure water |  | 46.25 | 46.43 | 49.15 | 57.35 |
| Total (percent by mass) |  | 100 | 100 | 100 | 100 |
| Evaluation | Static surface tension of ink (mN/m) | 23.1 | 20.3 | 21.5 | 26.5 |
|  | Contact angle (degrees) of water against ink film | 58 | 62 | 65 | 70 |
|  | Color unevenness (grade) | — | D | C | C |

TABLE 3

|  |  | Cleaning liquid |  |  |  |  |  |
|---|---|---|---|---|---|---|---|
| Component (percent by mass) |  | W-1 | W-2 | W-3 | W-4 | W-5 | W-6 |
| Surfactant | EMULGEN LS-106 | 1.5 |  |  | 2 |  |  |
|  | EMULGEN LS-110 |  | 1.5 | 1.5 |  |  |  |
|  | SOFTANOL EP7025 |  |  |  |  | 0.5 | 2 |
|  | TEGO WET 240 |  |  |  |  |  |  |
|  | FS-3100 |  |  |  |  |  |  |

TABLE 3-continued

|  |  | | | | | | |
|---|---|---|---|---|---|---|---|
| Organic solvent | Diethylene glycol monobutyl ether | | 15 | 50 | | | |
|  | Diethylene glycol diethyl ether | 40 | | | | | |
|  | Triethylene glycol monoethyl ether | | | | | 20 | 20 |
|  | Equamide<sup>trademark</sup> M100 | | | | 40 | | 25 |
|  | 1,3-butane diol | 10 | | | | | 10 |
|  | Glycerin | 5 | | 5 | | | |
|  | 2,2,4-trimethyl-1,3-pentanediol | | 2 | 2 | | 1 | |
|  | 2-ethyl-1,3-hexanediol | 2 | 1 | 1 | 2 | 1 | 3 |
|  | Pure water | 41.5 | 80.5 | 40.5 | 56 | 77.5 | 40 |
|  | Total (percent by mass) | 100 | 100 | 100 | 100 | 100 | 100 |
| Evaluation | Static surface tension (mN/m) | 26.5 | 30.9 | 26.8 | 24.8 | 34.1 | 27.2 |

| | | Cleaning liquid | | | | |
|---|---|---|---|---|---|---|
| Component (percent by mass) | | W-7 | W-8 | W-9 | W-10 | W-11 |
| Surfactant | EMULGEN LS-106 | 2.2 | | 0.4 | | |
|  | EMULGEN LS-110 | | | | | |
|  | SOFTANOL EP7025 | | | | 1 | |
|  | TEGO WET 240 | 1 | | 1 | | |
|  | FS-3100 | | 2 | | | 0.5 |
| Organic solvent | Diethylene glycol monobutyl ether | | | | | 10 |
|  | Diethylene glycol diethyl ether | 20 | | | | |
|  | Triethylene glycol monoethyl ether | 20 | 40 | | | |
|  | Equamide<sup>trademark</sup> M100 | 10 | 10 | | 15 | |
|  | 1,3-butane diol | | | 30 | | |
|  | Glycerin | | | 10 | | |
|  | 2,2,4-trimethyl-1,3-pentanediol | | | | | 2 |
|  | 2-ethyl-1,3-hexanediol | 2 | 2 | 2 | 2 | |
|  | Pure water | 44.8 | 46 | 56.6 | 82 | 87.5 |
|  | Total (percent by mass) | 100 | 100 | 100 | 100 | 100 |
| Evaluation | Static surface tension (mN/m) | 23.0 | 22.6 | 33.6 | 30.5 | 37.2 |

TABLE 4

| | | Post-processing fluid | | | |
|---|---|---|---|---|---|
| Component (percent by mass) | | P-1 | P-2 | P-3 | P-4 |
| Water-dispersible Resin | Urethane resin A (Tg: 41 degrees C.) | 5 | | | |
|  | Urethane resin A (Tg: −10 degrees C.) | | 30 | 20 | |
|  | Acrylic resin A (Tg: 12 degrees C.) | | | | 10 |
|  | Styrene acrylic resin A (Tg: 50 degrees C.) | | | | |
|  | Polyester resin A (Tg: 67 degrees C.) | | | | |
| Water-soluble organic solvent | 1,2-propanediol | 10 | 10 | 10 | 10 |
|  | 1,2-butanediol | | | | |
|  | 3-methoxy-3-methyl-1-butanol | 2 | 2 | 2 | |
| Surfactant | HW-1000 | | 0.05 | | 3 |
|  | WET270 | | | | |
|  | SAG503A | | | | |
|  | FS-3100 | 0.5 | | | |
| Mildew-proofing agent | Proxel GXL | 0.05 | 0.05 | 0.05 | 0.05 |
| Defoaming agent | 2,4,7,9-tetramethyl decane-4,7-diol | 0.5 | | | |
|  | 2,5,8,11-tetramethyldodecane-5,8-diol | | 0.4 | 0.4 | 0.4 |
| pH regulator | 2-amino-2-ethyl-1,3-propane diol | 0.2 | 0.2 | 0.2 | 0.1 |
| Permeating agent | 2-ethyl-1,3-hexane diol | 0.3 | 0.3 | 0.3 | 0.3 |
|  | Pure water | 81.45 | 57 | 67.05 | 76.15 |
|  | Total (percent by mass) | 100 | 100 | 100 | 100 |
|  | Storage stability (percent) | 3.6 percent | 7.8 percent | 7.8 percent | 9.8 percent |

| | | Post-processing fluid | | | |
|---|---|---|---|---|---|
| Component (percent by mass) | | P-5 | P-6 | P-7 | P-8 |
| Water-dispersible Resin | Urethane resin A (Tg: 41 degrees C.) | 3 | | | |
|  | Urethane resin A (Tg: −10 degrees C.) | | | | |
|  | Acrylic resin A (Tg: 12 degrees C.) | | 35 | | |
|  | Styrene acrylic resin A (Tg: 50 degrees C.) | | | 10 | |
|  | Polyester resin A (Tg: 67 degrees C.) | | | | 10 |

TABLE 4-continued

| Water-soluble organic solvent | 1,2-propanediol | 10 | 10 | | |
| | 1,2-butanediol | | | 15 | 15 |
| | 3-methoxy-3-methyl-1-butanol | 2 | 2 | 2 | 2 |
| Surfactant | HW-1000 | | 0.5 | | |
| | WET270 | 2 | | | |
| | SAG503A | | | | 1 |
| | FS-3100 | | 0.1 | | |
| Mildew-proofing agent | Proxel GXL | 0.05 | 0.05 | 0.05 | 0.05 |

TABLE 4-continued

| Defoaming agent | 2,4,7,9-tetramethyl decane-4,7-diol | 0.5 | 0.5 | 0.4 | 0.4 |
| | 2,5,8,11-tetramethyldodecane-5,8-diol | | | | |
| pH regulator | 2-amino-2-ethyl-1,3-propane diol | 0.2 | 0.2 | 0.2 | 0.2 |
| Permeating agent | 2-ethyl-1,3-hexane diol | 0.3 | 0.3 | 0.3 | 0.3 |
| Pure water | | 81.95 | 51.85 | 71.55 | 71.05 |
| Total (percent by mass) | | 100 | 100 | 100 | 100 |
| Storage stability (percent) | | −4.4 percent | 9.8 percent | −0.6 percent | 8.1 percent |

TABLE 5

| | Ink | | Cleaning liquid | Post-processing | Evaluation | | |
| | | | | | Contact angle (degrees) of water against | Static surface tension | Static surface tension |
| | Example No. | Ink No. | No. | fluid No. | ink film | of ink (mN/m) | of cleaning liquid (mN/m) |
|---|---|---|---|---|---|---|---|
| Example 2-1 | Example 1-1 | I-1 | W-1 | P-2 | 52 | 23.2 | 26.5 |
| Example 2-2 | Example 1-2 | I-2 | W-1 | P-2 | 57 | 23.1 | 26.5 |
| Example 2-3 | Example 1-3 | I-3 | W-2 | P-2 | 57 | 23.5 | 30.9 |
| Example 2-4 | Example 1-4 | I-4 | W-2 | P-1 | 60 | 23.5 | 30.9 |
| Example 2-5 | Example 1-5 | I-5 | W-3 | P-1 | 60 | 24.0 | 26.8 |
| Example 2-6 | Example 1-1 | I-1 | W-4 | P-1 | 52 | 23.2 | 24.8 |
| Example 2-7 | Example 1-1 | I-1 | W-5 | P-4 | 52 | 23.2 | 34.1 |
| Example 2-8 | Example 1-1 | I-1 | W-6 | P-4 | 52 | 23.2 | 27.2 |
| Example 2-9 | Example 1-1 | I-1 | W-7 | P-5 | 52 | 23.2 | 23.0 |
| Example 2-10 | Example 1-2 | I-2 | W-8 | P-6 | 57 | 23.1 | 22.6 |
| Example 2-11 | Example 1-2 | I-2 | W-9 | P-7 | 57 | 23.1 | 33.6 |
| Example 2-12 | Example 1-2 | I-2 | W-10 | P-8 | 57 | 23.1 | 30.5 |
| Example 2-13 | Example 1-2 | I-2 | W-11 | P-7 | 57 | 23.1 | 37.2 |
| Comparative Example 2-1 | Comparative Example 1-1 | I-10 | W-7 | P-1 | 62 | 22.3 | 23.0 |
| Comparative Example 2-2 | Comparative Example 1-1 | I-10 | W-8 | P-1 | 62 | 22.3 | 22.6 |
| Comparative Example 2-3 | Comparative Example 1-1 | I-10 | W-9 | P-2 | 62 | 22.3 | 33.6 |
| Comparative Example 2-4 | Comparative Example 1-2 | I-11 | W-10 | P-3 | 65 | 21.5 | 30.5 |
| Comparative Example 2-5 | Comparative Example 1-2 | I-11 | W-11 | P-3 | 65 | 21.5 | 37.2 |
| Comparative Example 2-6 | Comparative Example 1-2 | I-11 | W-1 | P-5 | 65 | 21.5 | 26.5 |
| Comparative Example 2-7 | Comparative Example 1-3 | I-12 | W-1 | P-6 | 70 | 26.5 | 26.5 |
| Comparative Example 2-8 | Comparative Example 1-3 | I-12 | W-7 | P-7 | 70 | 26.5 | 23.0 |
| Comparative Example 2-9 | Comparative Example 1-3 | I-12 | W-8 | P-8 | 70 | 26.5 | 22.6 |

| | Ink | | Cleaning liquid | Post-processing | Evaluation | |
| | | | | | Contact angle (degrees) of cleaning liquid against | Color unevenness |
| | Example No. | Ink No. | No. | fluid No. | ink film | (grade) |
|---|---|---|---|---|---|---|
| Example 2-1 | Example 1-1 | I-1 | W-1 | P-2 | 18 | A |
| Example 2-2 | Example 1-2 | I-2 | W-1 | P-2 | 19 | B |
| Example 2-3 | Example 1-3 | I-3 | W-2 | P-2 | 19 | B |
| Example 2-4 | Example 1-4 | I-4 | W-2 | P-1 | 19 | B |
| Example 2-5 | Example 1-5 | I-5 | W-3 | P-1 | 17 | A |
| Example 2-6 | Example 1-1 | I-1 | W-4 | P-1 | 18 | A |
| Example 2-7 | Example 1-1 | I-1 | W-5 | P-4 | 20 | A |
| Example 2-8 | Example 1-1 | I-1 | W-6 | P-4 | 16 | A |
| Example 2-9 | Example 1-1 | I-1 | W-7 | P-5 | 18 | A |
| Example 2-10 | Example 1-2 | I-2 | W-8 | P-6 | 15 | B |

TABLE 5-continued

| | | | | | | |
|---|---|---|---|---|---|---|
| Example 2-11 | Example 1-2 | I-2 | W-9 | P-7 | 20 | B |
| Example 2-12 | Example 1-2 | I-2 | W-10 | P-8 | 21 | B |
| Example 2-13 | Example 1-2 | I-2 | W-11 | P-7 | 22 | B |
| Comparative Example 2-1 | Comparative Example 1-1 | I-10 | W-7 | P-1 | 22 | D |
| Comparative Example 2-2 | Comparative Example 1-1 | I-10 | W-8 | P-1 | 21 | D |
| Comparative Example 2-3 | Comparative Example 1-1 | I-10 | W-9 | P-2 | 34 | D |
| Comparative Example 2-4 | Comparative Example 1-2 | I-11 | W-10 | P-3 | 34 | C |
| Comparative Example 2-5 | Comparative Example 1-2 | I-11 | W-11 | P-3 | 36 | C |
| Comparative Example 2-6 | Comparative Example 1-2 | I-11 | W-1 | P-5 | 30 | C |
| Comparative Example 2-7 | Comparative Example 1-3 | I-12 | W-1 | P-6 | 30 | C |
| Comparative Example 2-8 | Comparative Example 1-3 | I-12 | W-7 | P-7 | 28 | C |
| Comparative Example 2-9 | Comparative Example 1-3 | I-12 | W-8 | P-8 | 28 | C |

| | Ink | | Cleaning liquid | Post-processing | Evaluation | |
|---|---|---|---|---|---|---|
| | | | | | Permeability of cleaning liquid to | Cleaning |
| | Example No. | Ink No. | No. | fluid No. | inside of nozzle | power |
| Example 2-1 | Example 1-1 | I-1 | W-1 | P-2 | A | A |
| Example 2-2 | Example 1-2 | I-2 | W-1 | P-2 | A | A |
| Example 2-3 | Example 1-3 | I-3 | W-2 | P-2 | A | A |
| Example 2-4 | Example 1-4 | I-4 | W-2 | P-1 | A | B |
| Example 2-5 | Example 1-5 | I-5 | W-3 | P-1 | A | B |
| Example 2-6 | Example 1-1 | I-1 | W-4 | P-1 | A | A |
| Example 2-7 | Example 1-1 | I-1 | W-5 | P-4 | A | A |
| Example 2-8 | Example 1-1 | I-1 | W-6 | P-4 | A | A |
| Example 2-9 | Example 1-1 | I-1 | W-7 | P-5 | B | A |
| Example 2-10 | Example 1-2 | I-2 | W-8 | P-6 | B | A |
| Example 2-11 | Example 1-2 | I-2 | W-9 | P-7 | A | A |
| Example 2-12 | Example 1-2 | I-2 | W-10 | P-8 | A | B |
| Example 2-13 | Example 1-2 | I-2 | W-11 | P-7 | A | B |
| Comparative Example 2-1 | Comparative Example 1-1 | I-10 | W-7 | P-1 | B | C |
| Comparative Example 2-2 | Comparative Example 1-1 | I-10 | W-8 | P-1 | B | C |
| Comparative Example 2-3 | Comparative Example 1-1 | I-10 | W-9 | P-2 | A | D |
| Comparative Example 2-4 | Comparative Example 1-2 | I-11 | W-10 | P-3 | A | D |
| Comparative Example 2-5 | Comparative Example 1-2 | I-11 | W-11 | P-3 | A | D |
| Comparative Example 2-6 | Comparative Example 1-2 | I-11 | W-1 | P-5 | A | |
| Comparative Example 2-7 | Comparative Example 1-3 | I-12 | W-1 | P-6 | A | C |
| Comparative Example 2-8 | Comparative Example 1-3 | I-12 | W-7 | P-7 | C | C |
| Comparative Example 2-9 | Comparative Example 1-3 | I-12 | W-8 | P-8 | D | C |

| | Ink | | Cleaning liquid | Post-processing | Evaluation | | |
|---|---|---|---|---|---|---|---|
| | | | | | Surface | Abrasion | Dischargeability of ink or post- |
| | Example No. | Ink No. | No. | fluid No. | glossiness | resistance | processing fluid |
| Example 2-1 | Example 1-1 | I-1 | W-1 | P-2 | A | A | A |
| Example 2-2 | Example 1-2 | I-2 | W-1 | P-2 | A | A | A |
| Example 2-3 | Example 1-3 | I-3 | W-2 | P-2 | A | A | B |
| Example 2-4 | Example 1-4 | I-4 | W-2 | P-1 | B | A | B |
| Example 2-5 | Example 1-5 | I-5 | W-3 | P-1 | B | A | A |
| Example 2-6 | Example 1-1 | I-1 | W-4 | P-1 | A | A | A |
| Example 2-7 | Example 1-1 | I-1 | W-5 | P-4 | A | A | B |
| Example 2-8 | Example 1-1 | I-1 | W-6 | P-4 | A | A | B |
| Example 2-9 | Example 1-1 | I-1 | W-7 | P-5 | A | B | A |
| Example 2-10 | Example 1-2 | I-2 | W-8 | P-6 | B | B | A |
| Example 2-11 | Example 1-2 | I-2 | W-9 | P-7 | B | B | A |
| Example 2-12 | Example 1-2 | I-2 | W-10 | P-8 | B | B | A |

TABLE 5-continued

| | | | | | | | |
|---|---|---|---|---|---|---|---|
| Example 2-13 | Example 1-2 | I-2 | W-11 | P-7 | B | B | A |
| Comparative Example 2-1 | Comparative Example 1-1 | I-10 | W-7 | P-1 | C | A | B |
| Comparative Example 2-2 | Comparative Example 1-1 | I-10 | W-8 | P-1 | C | A | B |
| Comparative Example 2-3 | Comparative Example 1-1 | I-10 | W-9 | P-2 | C | A | B |
| Comparative Example 2-4 | Comparative Example 1-2 | I-11 | W-10 | P-3 | D | A | B |
| Comparative Example 2-5 | Comparative Example 1-2 | I-11 | W-11 | P-3 | D | A | B |
| Comparative Example 2-6 | Comparative Example 1-2 | I-11 | W-1 | P-5 | C | B | B |
| Comparative Example 2-7 | Comparative Example 1-3 | I-12 | W-1 | P-6 | C | B | B |
| Comparative Example 2-8 | Comparative Example 1-3 | I-12 | W-7 | P-7 | C | B | C |
| Comparative Example 2-9 | Comparative Example 1-3 | I-12 | W-8 | P-8 | C | B | D |

The present disclosure relates to the composition of the following 1 and also includes the following 2 to 12 as embodiments.

1. A liquid composition contains a coloring material, an organic solvent, a compound represented by Chemical Formula 1 below, a resin, and water, wherein the contact angle of water against a liquid composition film formed by attaching the liquid composition to a non-permeable printing medium is 60 degrees or less.

Chemical Formula 1

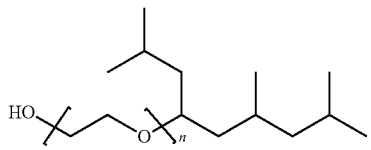

In Chemical Formula 1, n represents an integer of from 4 to 10.

2. The liquid composition according to 1 mentioned above, wherein the coloring material contains a resin-coated pigment. %% herein the organic solvent contains a diol having five or more carbon atoms.

3. The liquid composition according to 1 or 2 mentioned above, further contains sodium hydroxide or potassium hydroxide.

3. The liquid composition according to 1 or 2 mentioned above, further contains sodium hydroxide or potassium hydroxide.

5. The liquid composition according to any one of 1 to 4 mentioned above, wherein the organic solvent contains at least one member selected from the group consisting of an amide-based solvent and a substituted butanol.

6. A liquid discharging device includes a liquid discharging head having a nozzle, the liquid discharging head for discharging the liquid composition of any one of 1 to 5 mentioned above through the nozzle, a liquid container containing the liquid composition that is supplied to the liquid discharging head, and a wiping member for wiping the surface of the nozzle, the wiping member impregnated with a cleaning liquid containing a hydrocarbon-based surfactant at 0.5 to 2.0 percent by mass.

7. The liquid discharging device according to 6 mentioned above further includes a cleaning liquid applying device for applying the cleaning liquid to the wiping member.

8. The liquid discharging device according to 6 or 7 mentioned above, wherein the static surface tension of the cleaning liquid is greater than the static surface tension of the liquid composition.

9. A liquid discharging device includes a liquid discharging head having a nozzle, the liquid discharging head for discharging the liquid composition of any one of 1 to 5 mentioned above through the nozzle to a recording medium, a liquid container containing the liquid composition that is supplied to the liquid discharging head, a wiping member for wiping the surface of the nozzle, and a post-processing fluid applying device containing a post-processing fluid, the post-processing fluid applying device for discharging the post-processing fluid onto the liquid composition the liquid discharging device has discharged onto the recording medium.

10. The liquid discharging device according to 9 mentioned above, wherein the post-processing fluid contains a surfactant having a proportion of from 0.05 to 2.0 percent by mass.

11. The liquid discharging device according to 9 or 10 mentioned above, wherein the post-processing fluid contains a resin having a proportion of from 5 to less than 30 percent by mass.

12. The liquid discharging device according to 11 mentioned above, wherein the resin contains a urethane resin or an acrylic resin.

13. A method of manufacturing the liquid composition of 3 mentioned above includes mixing the coloring material, the organic solvent, the compound represented by Chemical Formula 1, the resin, water, and sodium hydroxide.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid composition comprising:
a coloring material;
an organic solvent;
a compound represented by Chemical Formula 1 below;
a resin; and
water, wherein a contact angle of water against a liquid composition film formed by attaching the liquid composition to a non-permeable printing medium is 60 degrees or less, Chemical Formula 1

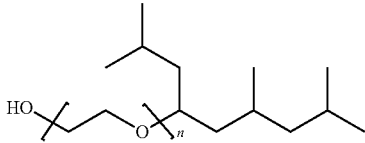

where n represents an integer of from 4 to 10.

2. The liquid composition according to claim 1,
wherein the coloring material comprises a resin-coated pigment,
wherein the organic solvent comprises a diol having five or more carbon atoms.

3. The liquid composition according to claim 1,
further comprising sodium hydroxide.

4. The liquid composition according to claim 1,
further comprising potassium hydroxide.

5. The liquid composition according to claim 1,
wherein the organic solvent comprises at least one member selected from the group consisting of an amide-based solvent and a substituted butanol.

6. A liquid discharging device comprising:
a liquid discharging head including a nozzle, the liquid discharging head configured to discharge the liquid composition of claim 1 through the nozzle;
a liquid container containing the liquid composition that is supplied to the liquid discharging head; and
a wiping member configured to wipe a surface of the nozzle, the wiping member impregnated with a cleaning liquid comprising a hydrocarbon-based surfactant at 0.5 to 2.0 percent by mass.

7. The liquid discharging device according to claim 6,
further comprising a cleaning liquid applying device configured to apply the cleaning liquid to the wiping member.

8. The liquid discharging device according to claim 6,
wherein a static surface tension of the cleaning liquid is greater than a static surface tension of the liquid composition.

9. A liquid discharging device comprising:
a liquid discharging head comprising a nozzle, the liquid discharging head configured to discharge the liquid composition of claim 1 through the nozzle to a recording medium;
a liquid container containing the liquid composition that is supplied to the liquid discharging head;
a wiping member configured to wipe a surface of the nozzle; and
a post-processing fluid applying device containing a post-processing fluid, the post processing fluid applying device configured to discharge the post-processing fluid onto the liquid composition the liquid discharging device has discharged onto the recording medium.

10. The liquid discharging device according to claim 9,
wherein the post-processing fluid comprises a surfactant at 0.05 to 2.0 percent by mass.

11. The liquid discharging device according to claim 9,
wherein the post-processing fluid comprises a resin at 5 to 30 percent by mass.

12. The liquid discharging device according to claim 11,
wherein the resin comprises a urethane resin or an acrylic resin.

13. A method of manufacturing the liquid composition of claim 3 comprising:
mixing the coloring material, the organic solvent, the compound represented by Chemical Formula 1, the resin, water, and the sodium hydroxide.

\* \* \* \* \*